United States Patent
Wickramarathne et al.

(10) Patent No.: US 11,170,639 B2
(45) Date of Patent: Nov. 9, 2021

(54) TRANSPORTATION THREAT DETECTION SYSTEM

(71) Applicants: University of Massachusetts, Boston, MA (US); Peter Bauer, Notre Dame, IN (US)

(72) Inventors: Thanuka Wickramarathne, Andover, MA (US); Peter Bauer, South Bend, IN (US)

(73) Assignees: UNIVERSITY OF MASSACHUSETTS, Boston, MA (US); Peter Bauer, South Bend, IN (US)

(*) Notice: Subject to any disclaimer, the term of this patent is extended or adjusted under 35 U.S.C. 154(b) by 0 days.

(21) Appl. No.: 16/810,729

(22) Filed: Mar. 5, 2020

(65) Prior Publication Data

US 2020/0286370 A1    Sep. 10, 2020

Related U.S. Application Data

(60) Provisional application No. 62/814,089, filed on Mar. 5, 2019.

(51) Int. Cl.
*G08G 1/09* (2006.01)
*G08G 1/01* (2006.01)
(Continued)

(52) U.S. Cl.
CPC ....... *G08G 1/0112* (2013.01); *G01C 21/3691* (2013.01); *G01S 19/42* (2013.01); *G08G 1/0141* (2013.01); *G08G 1/096775* (2013.01)

(58) Field of Classification Search
CPC .............. G08G 1/0112; G08G 1/0141; G08G 1/096775; G01C 21/2691; G01S 19/42
(Continued)

(56) References Cited

U.S. PATENT DOCUMENTS 5,914,720 A * 6/1999 Maples ................... G06F 3/011
                                                        345/419
6,763,292 B1 * 7/2004 Smith .................. B60G 17/015
                                                        701/1
(Continued)

OTHER PUBLICATIONS

Garg., V., et al., "Ubiquitous Sensing for Enhanced Road Situational Awareness: A Target-Tracking Approach," Proc. EEE Int. Conf. on Intelligent Transportation Systems (ITSC), 2018, (5 pages).
(Continued)

*Primary Examiner* — Kerri L McNally
*Assistant Examiner* — Thang D Tran
(74) *Attorney, Agent, or Firm* — Hamilton, Brook, Sith & Reynolds, P.C.

(57) ABSTRACT

A transportation threat detection system includes a communication module that receives an inertial event report from a reporting vehicle. The report includes (i) an indication of an inertial event from an inertial sensor at the reporting vehicle, and (ii) an indication of a geographic location associated with the event. The system also includes a fusion processor that associates the inertial event report with a potential transportation threat, consistent with the inertial event report and at the geographic location. The fusion processor generates a measure of support for the transportation threat potentially existing at the geographic location based on a participation rate generated using any additional inertial event reports received from respective additional reporting vehicles. The system also includes a reporting interface that renders output indicative of the potential transportation threat, wherein the output is made as a function of the generated measure of support.

23 Claims, 13 Drawing Sheets

(51) Int. Cl.
    *G01C 21/36* (2006.01)
    *G01S 19/42* (2010.01)
    *G08G 1/0967* (2006.01)
(58) Field of Classification Search
    USPC .......................................................... 340/905
    See application file for complete search history.

(56) References Cited

U.S. PATENT DOCUMENTS

| | | | |
|---|---|---|---|
| 7,421,334 B2 | 9/2008 | Dahlgren et al. | |
| 8,612,136 B2 | 12/2013 | Levine et al. | |
| 9,120,484 B1* | 9/2015 | Ferguson | G06T 7/20 |
| 10,156,848 B1* | 12/2018 | Konrardy | G06F 16/2455 |
| 10,235,882 B1* | 3/2019 | Aoude | G08G 1/096716 |
| 10,489,976 B2* | 11/2019 | Jin | H04N 5/23296 |
| 2003/0187571 A1* | 10/2003 | Impson | G07C 5/008 |
| | | | 701/117 |
| 2005/0065711 A1* | 3/2005 | Dahlgren | G08G 1/01 |
| | | | 701/117 |
| 2005/0134440 A1* | 6/2005 | Breed | G01S 17/89 |
| | | | 340/435 |
| 2008/0140303 A1* | 6/2008 | Hiruta | G08G 1/0104 |
| | | | 701/116 |
| 2009/0072024 A1* | 3/2009 | Bonneau, Jr. | G06Q 10/06 |
| | | | 235/380 |
| 2009/0326791 A1* | 12/2009 | Horvitz | G08G 1/00 |
| | | | 701/119 |
| 2010/0141425 A1* | 6/2010 | Tracey | G08B 13/1418 |
| | | | 340/539.1 |
| 2011/0298638 A1* | 12/2011 | Groeneweg | G08G 1/096775 |
| | | | 340/905 |
| 2013/0158821 A1* | 6/2013 | Ricci | G07C 5/006 |
| | | | 701/51 |
| 2014/0297119 A1* | 10/2014 | Giovanardi | F16K 31/12 |
| | | | 701/38 |
| 2014/0306834 A1* | 10/2014 | Ricci | G06Q 30/00 |
| | | | 340/902 |
| 2015/0061895 A1* | 3/2015 | Ricci | G06Q 10/20 |
| | | | 340/902 |
| 2015/0207813 A1* | 7/2015 | Reybok | H04L 63/145 |
| | | | 726/22 |
| 2015/0274180 A1* | 10/2015 | Prakah-Asante | B60K 35/00 |
| | | | 701/36 |
| 2016/0006922 A1* | 1/2016 | Boudreau | H04N 7/185 |
| | | | 348/207.1 |
| 2016/0082964 A1* | 3/2016 | Chunodkar | B60W 40/076 |
| | | | 701/70 |
| 2016/0133130 A1* | 5/2016 | Grimm | H04W 4/80 |
| | | | 340/905 |
| 2016/0210834 A1* | 7/2016 | Dayal | A61H 3/061 |
| 2016/0236638 A1* | 8/2016 | Lavie | H04N 7/185 |
| 2016/0286026 A1* | 9/2016 | Lord | H04M 1/72409 |
| 2017/0018167 A1* | 1/2017 | Dey | G08B 29/20 |
| 2017/0192089 A1* | 7/2017 | Parker | G01S 13/88 |
| 2018/0075309 A1* | 3/2018 | Sathyanarayana | G05D 1/0055 |
| 2018/0247541 A1* | 8/2018 | Cheremushkina | G07C 5/008 |
| 2019/0051172 A1* | 2/2019 | Stenneth | H04W 4/44 |
| 2019/0102840 A1* | 4/2019 | Perl | B60W 40/09 |
| 2019/0132709 A1* | 5/2019 | Graefe | H04W 4/38 |
| 2019/0147736 A1* | 5/2019 | Camp | G08G 1/0133 |
| | | | 340/905 |
| 2019/0197080 A1* | 6/2019 | Bondareva | G06Q 10/0631 |
| 2019/0351899 A1* | 11/2019 | Adam | G08G 1/166 |
| 2020/0286183 A1* | 9/2020 | Furukawa | B60W 40/09 |

OTHER PUBLICATIONS

Garg., V., et al., "A cloud-based MHT framework fortracking spatio-temporal phenomena in ubiquitous sensing environments," Proc. Int. Conf. on Information Fusion (FUSION), 2018 (6 pages).
Metzner et al., "On Multi-Sensor Radar Configurations for Vehicle Tracking in Autonomous Driving Environments," Proc. Int. Conf. on Information Fusion (FUSION), 2018, 1-8.
Wickramarathne, T., et al., "On the Use of 3-D Accelerometers for Road Quality Assessment," Proc. IEEE Vehicular Technology Conference (VTC—Spring), 2018, 1-5.
Nica, Gabriel, "Video: BMW Introduces Hazard Preview 2.0 System" (available at https://www.bmwblog.com/2018/04/18/video-bmw-introduces-hazard-preview-2-0-system/), Apr. 18, 2018, BMW Blog.
Riehm, M., et al., "Ice formation detection on road surfaces using infrared thermometry" Cold Regions Science and Technology; vols. 83-84, Dec. 2012, pp. 71-76.
Pinggera, P., et al., "Lost and Found: Detecting Small Road Hazards for Self-Driving Vehicles" Sep. 15, 2016.
Madhumathy, P., et al., "Detection of humps and potholes on roads and Notifying the same to the drivers", International Journal of Management and Applied Science, vol. 3, Issue-1, Jan. 2017.
Bhatt, U., et al., "Intelligent Pothole Detection and Road Condition Assessment" Bloomberg Data for Good Exchange Conference.Sep. 24, 2017.
Revolta, D. "Pothole detection system showcased by Jaguar Land Rover," Jun. 17, 2015 (available at https://www.autocar.co.uk/car-news/new-cars/pothole-detection-system-showcased-jaguar-land-rover).
Dewasurendra, D., et al., "Evidence Filtering" IEEE Transactions on Signal Processing, vol. 55, No. 12, Dec. 2007.
Peck, M., "DARPA seeks 'smart plants' to protect soldiers," Dec. 7, 2017 (available at https://defensesystems.com/articles/2017/12/07/darpa-plant-sensors.aspx).
Aguilar J., "Robust Road Condition Detection System Using In-Vehicle Standard Sensors," Published Dec. 19, 2015, available at https://www.ncbi.nlm.nih.gov/pmc/articles/PMC4721825/).
Fazeen, M., et al., "Safe Driving Using Mobile Phones" IEEE Transactions on Intelligent Transportation Systems, vol. 13, No. 3, Sep. 2012.
Vittorio, A., et al., "Automated sensing system for monitoring of road surface quality by mobile devices," Procedia—Social and Behavioral Sciences 111 (2014) 242-251.

* cited by examiner

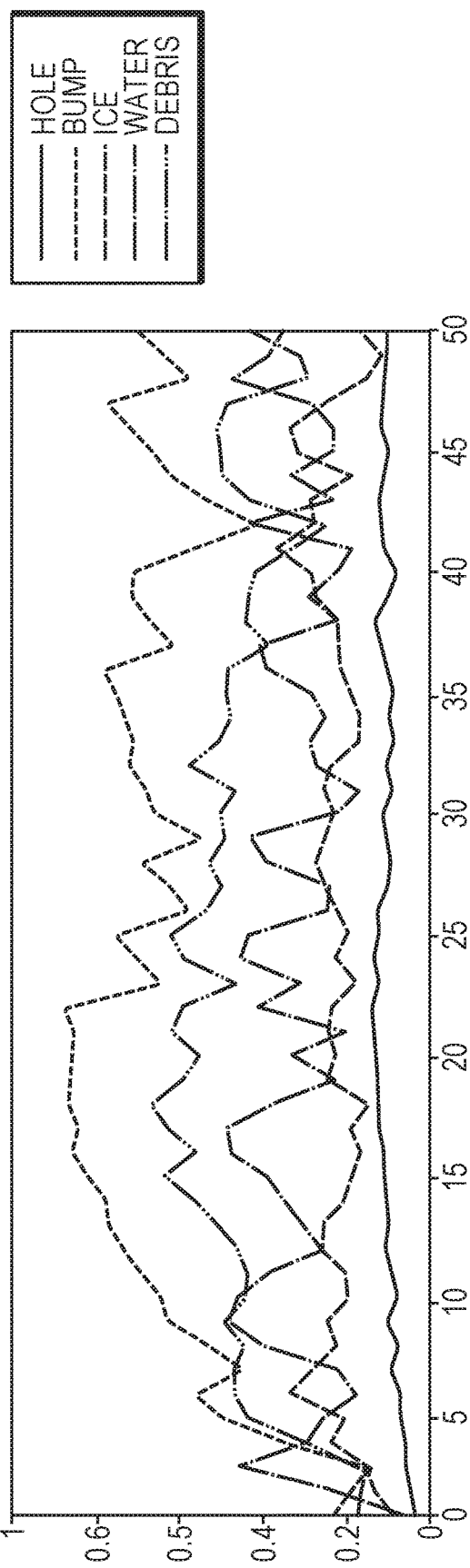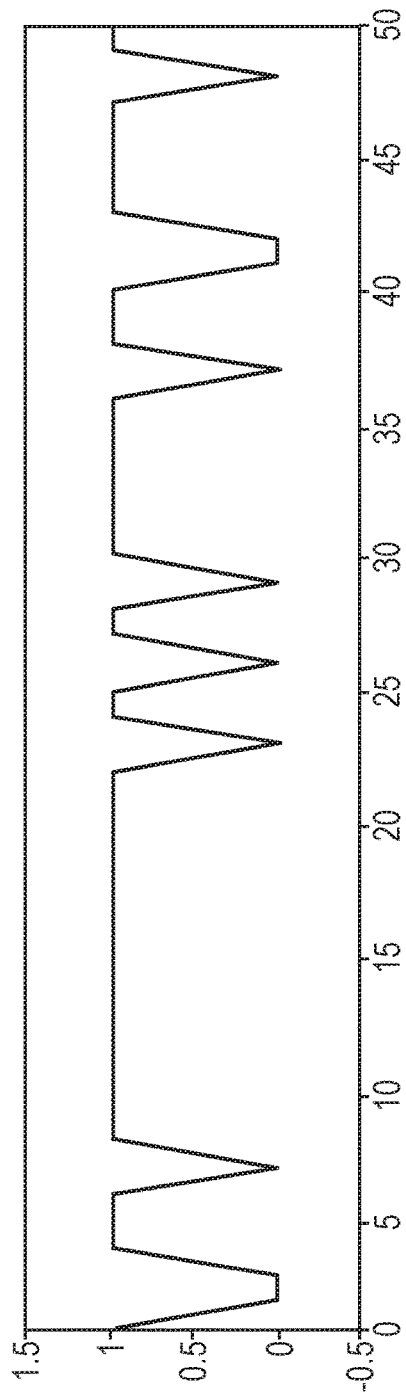

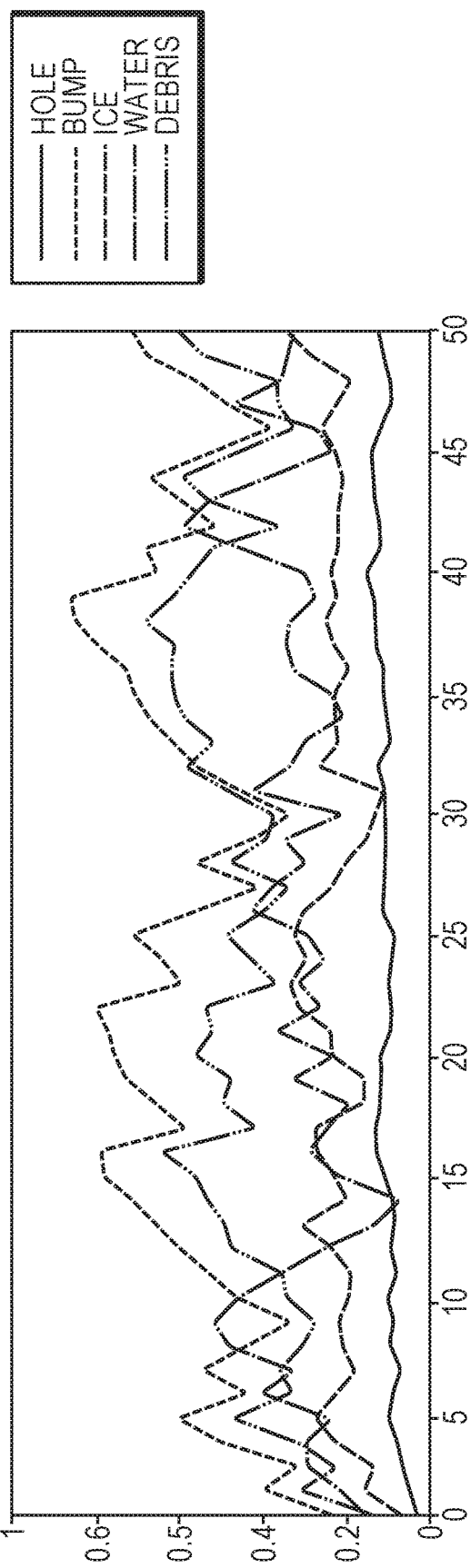
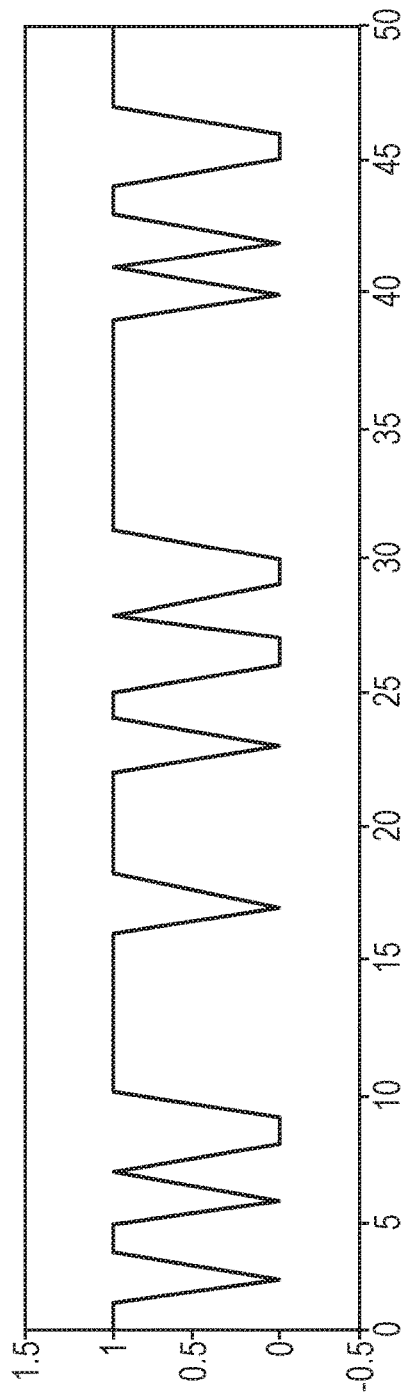
FIG. 11A
FIG. 11B

TRANSPORTATION THREAT DETECTION SYSTEM

RELATED APPLICATION

This application claims the benefit of U.S. Provisional Application No. 62/814,089, filed on Mar. 5, 2019. The entire teachings of the above application is incorporated herein by reference.

BACKGROUND

For Trillions of miles driven by motorists every single year, one denominator that categorically identifies with transportation-related problems is the hazardous conditions on the road. Roadway hazards, and how motorists respond to them, are at the root of many challenges, ranging from short-term effects such as traffic-congestion and accidents (that lead to loss of life and lawsuits) to long-term effects such as increased pollution (due to increased emissions) and financial loss, all of which have a tremendous impact on a country's economy and overall well-being. A case in point is the allocation of billions of dollars by the United States Congress to repair and refresh road infrastructure across the country soon after the 2008 financial crisis in the United States.

SUMMARY

One fundamental problem associated with timely repair/maintenance of roadways and hazard management is an enormous overhead associated with acquiring comprehensive and up-to-date data for efficient planning and management of these activities. Local and federal governments, which typically have primary responsibility for these planning, management, and repair, have limited resources to deal with these activities. For instance, the current state-of-the-art employed by authorities involves either deploying public works personnel or (paid) consultants to develop road condition surveys/maps either by manually inspecting roadways or utilizing sophisticated and expensive road assessment vehicles. While there are smart-phone applications ("apps") on the market that help motorists avoid traffic congestion and sometimes identify obvious road hazards such as potholes, the ability to pinpoint general types of road hazards, their severity, and degradation rates in these systems is almost non-existent. The current state-of-nature on road hazard detection and management has a coupled negative impact on (a) motorists, (b) auto-makers and (c) management authorities.

A first aspect of the negative impact is that, from a motorists' perspective, poor road conditions and hazards not only decrease ride quality, but also increase fuel consumption, rate of degradation of motor vehicles, and vehicle maintenance needs. In fact, it is estimated that about USD300 per car per year is spent by U.S. motorists in repair costs due to damages and degradation to vehicle frame, suspension, and tires caused by road abnormalities such as potholes.

A second aspect of the negative impact is that, perhaps motivated by the demands of emerging autonomous driving environments, a recent growth can be seen in vehicular technologies for identifying road conditions that adversely affect driver comfort. One example includes automatic detection and reaction to potholes, as described in "*Pothole detection system showcased by Jaguar Land Rover,*" by D. Revolta, Autocar, Jun. 17, 2015 (available at https://www.autocar.co.uk/car-news/new-cars/pothole-detection-system-showcasedjaguar-land-rover), which is hereby incorporated by reference in its entirety. Another example includes BMW (Bavarian Motor Vehicle) Hazard Preview 2.0 System by Gabriel Nica, BMWblog, Apr. 18, 2018 (available at https://www.bmwblog.com/2018/04/18/video-bmw-introduces-hazard-preview-2-0-system/), which uses the extensive sensor arrays available in (highly complex and expensive) BMW motor vehicles to detect events of interest with the assistance of other vehicles carrying similar sensing capabilities. These current technologies are centered around improving ride comfort and safety of high-end luxury vehicles. This approach is problematic because it focuses only on a tiny fraction of automobile market and will not provide sufficient market penetration to obtain the necessary coverage required for both safety of motorists as well as authorities.

A third negative impact of current methods relates to road management authorities. Due to lack of comprehensive and timely information on hazard and degrading road conditions, authorities are incapable of devising optimal strategies for repair/maintenance and management of hazardous conditions other than simply following ad-hoc/preset schedules or responding to emergencies. Accordingly, in the non-optimal current methods, from an engineering standpoint, one significant problem is a lack of comprehensive and up-to-date information on degrading road conditions, their severity, and their impact on motor-vehicles.

Embodiments described herein can address the problem of achieving enhanced situational awareness on road networks with respect to hazardous road conditions, including hazards of various types. In particular, challenges faced by motorists, automakers, and civil authorities with relevance to transportation are addressed. For example, reliable identification and reporting of road hazards can be obtained in embodiments, optionally based only on inertial sensors, and optionally substantially without any user intervention other than users providing for or allowing a smart phone application or a car-based application to run.

In one embodiment, a transportation threat detection system includes a communication module configured to receive an inertial event report from a reporting vehicle. The inertial event report includes (i) an indication of an inertial event from one or more inertial sensors or from an inertial sensor and other sensors at the reporting vehicle and (ii) an indication of a geographic location associated with the inertial event. The system also includes a fusion processor configured to associate the inertial event report with a potential transportation threat, consistent with the inertial event report at the geographic location. The fusion processor is further configured to generate a measure of support for the transportation threat potentially existing at the geographic location based on a participation rate generated using any additional inertial event reports received from respective additional reporting vehicles. The system also includes a reporting interface that can render output indicative of the potential transportation threat, wherein the output is as a function of the generated measure of support. The measure of support generated by the fusion processor may generally be based on many criteria in addition to any additional inertial event reports.

The measure of support can be a probability or any other measure of support quantifying the likelihood of the event under consideration in a meaningful manner. As one alternative to a strict probability, the measure of support may be a normalized threat level indicating a level of support for the potential transportation threat. A threat level may range from 0 to 1 or another interval representing the range of support values from lowest to highest. Each of a plurality of different potential threats may be assigned its own determined probability or other measure of support, and each measure of support may be updated as inertial event reports or other information pertaining to the transportation threats are received. Each hazard in one location may be associated with a measure of support that quantifies how likely it is to exist. There is a possibility that different types of hazards may exist in a given location. A given location may be subject to resolution of location estimation. In some embodiments, if location can be determined only with +/−2 m accuracy, common with current standard GPS receivers, then location values corresponding to a circle of 2 m radius may be considered one location, and multiple types of road hazards exist at the location. Accordingly, an estimated probability distribution may describe what hazards are likely to be within the radius considered to be the given location.

The communication module, fusion processor, and reporting interface can form part of a transportation threat management system server. Alternatively, functions of the communication module, fusion process, and reporting interface can be performed in a distributed environment, such that no server is necessary. The fusion processor can be further configured to generate respective measures of support for a plurality of distinct potential transportation threats that may potentially exist at the same geographic location or geographic locations that are indistinguishable due to location estimation accuracy or other reasons that affect the accuracy of the geographic location associated with transportation threats.

The measure of support can be an initial measure of support, and the fusion processor can be further configured to generate an updated measure of support for the transportation threat potentially continuing to exist at the geographic location, the updated measure of support being generated as a function of both the initial measure of support, additional inertial event reports, and other information pertaining to the transportation threat received subsequent to generation of the initial measure of support.

The fusion processor may be configured to distinguish between an inertial event caused by the potential transportation threat and an inertial event caused by a reaction of a receiving vehicle to the rendered output. The receiving vehicle can receive the rendered output indicative of the potential transportation threat and can be triggered to react to the rendered output.

The potential transportation threat can be a hazard resulting from ice, water, oil, or debris on a road, or an animal or human on or near the road; a pothole, a dangerous intersection, a vehicular accident, an unidentified potential threat; an oncoming traffic danger, an erratic driver, or another moving threat; or a limited visibility, a storm, wind, a tornado, a lightning strike, or another weather-based event.

The communication module may be further configured to receive the rendered output indicative of the potential transportation threat and to communicate the rendered output to a receiving vehicle. The receiving vehicle can be autonomous, semi-autonomous, or operated by a driver. The communication module can be further configured to receive the rendered output indicative of the potential transportation threat and to communicate said rendered output to a navigation system of a receiving vehicle, another driver assistance module of the receiving vehicle, or, in the case of an autonomous or semi-autonomous vehicle, to a module that controls or monitors the dynamic driving task of the receiving vehicle. The communication module can be further configured to receive the rendered output indicative of the potential transportation threat and to communicate said rendered output to a mobile computing device, a mobile telephone, or to another communication device configured to receive the rendered output.

The rendered output indicative of the potential transportation threat may form part of a local threat map indicating one or more threats in a current or future environment of a receiving vehicle that receives the rendered output. As an alternative, or in addition, the rendered output can form part of a global threat map indicating one or more threats in a geographic region that is larger than the current or future environment of the receiving vehicle. The communication module can be further configured to receive the rendered output indicative of the potential transportation threat and to communicate the rendered output to a governmental, commercial, or news facility. The communication module can be further configured to process transportation threats and potential transportation threats for a particular road, area, region, or combination thereof, either from a single vehicle, vehicles of certain types, multiple vehicles, or a selected combination thereof and to communicate the rendered output to an interested party including, but not limited to, governmental, auto-maker, insurance, news, infrastructure maintenance, or other related entities.

The inertial sensor can be in a mobile computing device at the reporting vehicle. The inertial sensor can be an on-board vehicle sensor at the reporting vehicle. The inertial sensor can also be a retrofitted sensor added at the reporting vehicle for collecting inertial event reports for transportation threat identification or for a purpose other than transportation threat identification. The geographic location can be provided via a GPS receiver of a mobile computing device or on-board navigation system or any other instrument that generates the current location at the reporting vehicle.

The communication module may be further configured to receive the inertial event report from the reporting vehicle via an application running on a mobile computing device at the reporting vehicle. The communication module may be further configured to receive the inertial event report from the reporting vehicle via an application running in an existing computing unit of the reporting vehicle or a computing unit retrofitted to the car for transportation threat processing or a purpose different from that of transportation threat processing. The communication module may be further configured to receive the inertial event report along with information other than inertial reports from the reporting vehicle.

The fusion processor may be further configured to query, automatically, through the communication module, vehicles approaching the geographic location associated with the inertial event to obtain the additional inertial event reports or other information or combination to determine the participation rate or other factors pertaining to transportation threats, their processing or communication or operation of transportation threat detection system.

The fusion processor may be further configured to generate the measure of support using a time-variant nonlinear threat update equation. In such an update equation, both the previous threat level and the driving inputs can enter the equation in nonlinear time-variant manner or in a simplified linear time-variant manner.

A particular embodiment system described herein is referred to as "Situational Awareness For Emergent Network Enabled Transportation Systems" (SAFENETS). SAFENETS includes technology that enables detection of dangerous road conditions and impending hazards and can inform motorists before the dangerous road conditions cause damage. Drivers need not be directly involved in the data collection or threat identification process. This approach is fundamentally different from existing smart-phone applications, such as Waze®, operate based on either (i) the road hazard caused by a traffic disturbance or (ii) voluntarily participating drivers reporting the presence of obvious hazards, such as potholes, by manually marking on a map. Therefore, with existing smart-phone applications, non-trivial hazards that are likely to cause accidents are never diagnosed unless serious and/or repeated accidents occur. Furthermore, since the hazards are manually reported by humans in such existing applications, such systems are prone to significant human errors, both in terms of hazard type, location as well as many accounts of misreporting. The SAFENETS approach is also different to methods used by some high-end Automakers, whereby advanced sensing capabilities of such vehicles along with the proprietary knowledge of their operation is leveraged for detection and identification of transportation threats. While SAFENETS can utilize additional sensing modalities, it can also be deployed to many vehicles that either do not have such advanced sensing capabilities or do not wish to utilize such capabilities for transportation threat detection or related activities.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 10A-10B are graphs illustrating threat function values calculated for a bump in a road.

FIGS. 11A-11B are graphs illustrating threat function value calculations for a simulation of debris in a road.

DETAILED DESCRIPTION

A description of example embodiments follows.

Even though vehicles passing a 'threat zone' may "feel the effects" of degrading/degraded road conditions, these problematic conditions often go undetected and remain hidden until a significant accident/hazard occurs and/or the conditions become too severe. At its extreme, road hazards often cause accidents and even loss of life. At less extreme and not so obvious situations, road hazards cause traffic congestions, especially due to unexpected and uncontrollable response of motorists to such hazards. These situations can largely be mitigated or at least minimized using embodiments that can alert the motorists of the presence of hazardous conditions, perhaps along with some recommendations for avoidance. In the case of human-driven motor-vehicles, this alerting and these recommendations would assist the human driver in avoiding hazards. Alerting can be done with sufficient time to allow for evasive maneuvers. In the case of autonomous or semi-autonomous vehicles, these alerts may be directly routed to the appropriate control units and/or navigation system that controls the dynamic driving task.

One embodiment system, referred to herein as "Situational Awareness For Emergent Network Enabled Transportation Systems" (SAFENETS), is a technology that can alert motorists of upcoming transportation threats and even provide recommendations for avoiding them. By essentially turning vehicles into mobile sensors, SAFENETS implements capability to detect dangerous road conditions and impending hazards without needing to involve drivers in the data collection or threat identification process. The sensor data gathered in a vehicle can be preprocessed before sending them to a SAFENETS processing node or processing center or combination of both. The primary processing center implements a complex suite of data fusion methods to efficiently combine information coming from multiple sources, process them and extract information to automatically identify road hazards (also referred to as threats), their type, severity, and any other characteristic that aids in tasks related to driver comfort, damage minimization, dynamic adjustments to vehicle parameters to achieve driver comfort and/or minimize damage (e.g., suspension, drivetrain, powertrain, tire-pressure, etc.), road maintenance, navigation to avoid hazards and/or minimize energy and/or emissions, or any other related task. The threat data can then be utilized by motorists, automakers and management authorities for numerous tasks ranging from driver alerts to traffic routing/detours to improved navigation systems to efficient road repair and management scheduling.

Figure 1A:
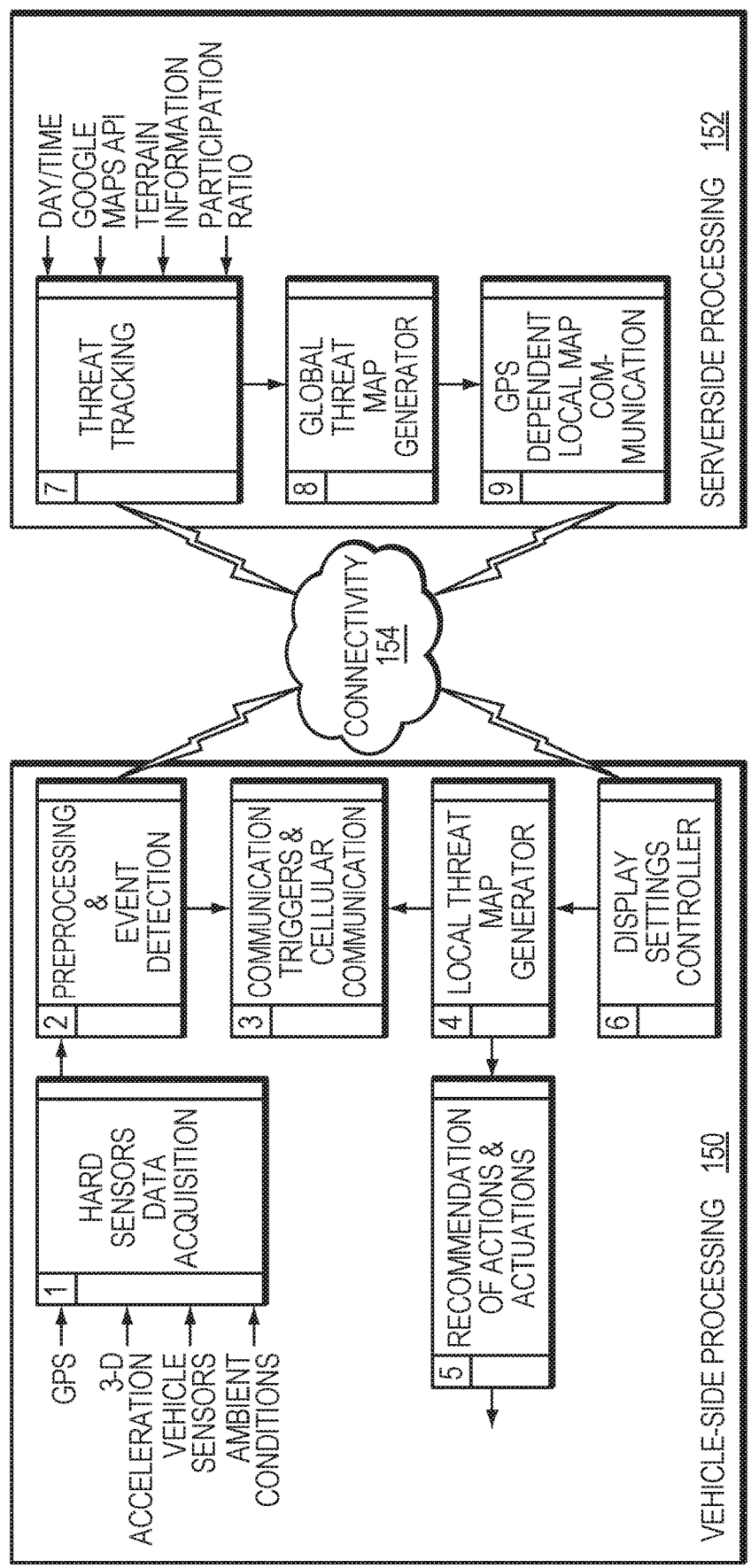
FIG. 1A is a block diagram illustrating a system architecture for a particular embodiment system referred to as "Situational Awareness For Emergent Network Enabled Transportation Systems" (SAFENETS), illustrating major functional components on both vehicle side and server side, including data/sensor inputs, wherein the SAFENETS primary fusion node is implemented in a centralized system instead of an alternative decentralized system.

FIG. 1A is a block diagram illustrating a system architecture for a particular embodiment SAFENETS system, illustrating major functional components on both a vehicle side 150 and server side 152, including data/sensor inputs. Three functional module blocks, namely a fusion processor module, communication module, and reporting interface of a general embodiment transportation threat detection system as described hereinafter in relation to FIG. 3A, for example, can be implemented in many ways, wherein fusion processor operations can be centralized, de-centralized, distributed or combination of all at different levels/scales. Communication module and reporting interface operations can also be implemented in different ways. FIG. 1A only shows one example embodiment wherein the three functional module blocks are implemented on the vehicle side 150 and the server side 152. It should be understood that the vehicle-side processing 150 may be implemented in mobile phone, an on-board vehicle computer, or a combination thereof, according as a person of ordinary skill in the art of systems and communications architectures will understand in view of this description. The two sides 150 and 152 may be connected by cell phone communication, satellite-based communication, WiFi communication, infrared communication, free-space optical communication, radio communication, or any other communication method, in addition to some of the processing functional modules in FIG. 1A being connected by Ethernet or other wired connections, as will be understood by one of ordinary skill in the art, as indicated by the connectivity 154.

While the SAFENETS system can use vehicles as mobile sensors, depending on the type of embodiment chosen, the type of sensing can take different forms. In one basic embodiment, a smartphone positioned securely in the vehicle can record inertial navigation system (INS) measurements (i.e., inertial measurements, such as 3-axis acceleration, gyroscope rotation measurements, etc.), along with global positioning system (GPS) data, in order to monitor evasive maneuvers, turns, acceleration/deceleration patterns, irregularities in the pavement, etc. In a more complex embodiment, the sensor information can originate from the vehicle's sensor suite to acquire data including, but not limited to, INS measurements, steering angle, anti-lock braking system (ABS) data, and stability control data.

Another embodiment can deploy an add-on hardware unit (e.g., similar to a portable navigation device) that includes GPS and INS sensors, one or more microphones, and/or a display unit with optional sounds. These data then carry a wealth of information that can be used to identify road hazards experienced by passing vehicles, even if they don't take a full 'hit' (e.g., a vehicle may not dive into a pothole, but perhaps make an evasive maneuver to avoid it or partially run over by one wheel). One feature includes the ability of the SAFENETS system to process, interpret and combine data generated from different vehicles at different occasions. This may be done via an effective combination of data processing, filtering, detection, fusion, tracking, and data association methods. The SAFENETS system may include two main parts: a participant (i.e., a mobile sensor) and a SAFENETS primary fusion node (i.e., the server) as shown in FIG. 1A, wherein this server performs functions of a communication module, fusion processor and reporting interface, as implemented in other embodiment systems, in addition to other optional features.

SAFENETS can implement three basic operational modes: (a) real-time, (b) offline, and (c) summary, based on the connectivity mode and type of information sent to the end-user. In real-time mode, a user may be notified of impending threat situations via a graphical user interface (similar to a navigation system) with an optional audio or vibration or other warning so that the motorists can take precautions in a timely manner. In the case of an autonomous or semi-autonomous vehicle, this information can be coded in an appropriate manner to be utilized by the modules that control and/or monitor dynamic driving tasks and/or alerting an operator or passenger of the impending dangers. In the offline operational mode, a user may 'download' a latest copy of transportation threats in terms of threat zones, types, locations, and their severity that can be utilized in navigation, route planning or any other task that can be aided with such information. Summary mode is primarily intended for authorities responsible for road repair/maintenance or traffic management or other transportation management tasks, police/fire/other-emergency personnel, transportation planning/control authorities who may want to acquire detailed statistics, degradation analysis, threat development patterns, general risky areas, and other miscellaneous reports, commercial entities including but not limited to insurance, auto-makers, legal, or auto services. In any of these modes, the information available to a motorist, other people, or an semi-/fully-autonomous vehicle can include the threat type (e.g., icy road, pothole, deer crossing, etc.), threat severity, location, and other miscellaneous information. Information that is provided may also include recommendations to drivers, other persons, or an semi-/fully-autonomous vehicle regarding how to respond to the threat.

In order to provide different types of information, different customer needs, access frequency, different levels of authentication, and subscription types, a SAFENETS processing center implements several interfaces. For example, Departments of Public Works personnel can utilize one type of interface to obtain updated, aggregated data before planning weekly/monthly maintenance and repair schedules. In other contexts, in contrast, another interface can provide hourly (or even more granular) information for traffic routing and planning. A vehicle navigation and/or control system or a smartphone app can obtain (near) real-time data regarding impending transportation threats for navigational, routing, driver assistance or any other related needs.

The SAFENETS embodiment system differs from existing applications in several fundamental ways. Most importantly, the existing smartphone traffic applications such as WAZE® use the occurrence of an accident to provide information about an event or a hazard or traffic situation, whereas SAFENETS has the capability to warn about some potential transportation threats before the threat actually causes any damage. In particular, these applications can identify road hazards in two different ways. First, if a road hazard causes a traffic disturbance (e.g., drivers slowing down, swerving, etc.), then an automated system may register these events as a hazard. Second, a voluntarily participating user may report the presence of an obvious hazard, such as a pothole, by manually marking on a map (i.e., crowd sourcing).

WAZE® and some other existing apps require a user to make the decision to report an event and/or send in photos or comments. In these existing apps, while information such as trip time, distance, and speed are automatically estimated, event reports are manually evaluated by what is referred to as a map editing community. While the users of such applications may be informed of hazards reported by other users, the credibility of such reports are unknown. Given the manual evaluation of reported events when using existing apps, any verified events/hazards are very likely to be obsolete by the time they are verified or reported to app users. Furthermore, using these existing apps, non-trivial transportation hazardous such as sharp corners or bridge expansion gaps (that are likely to cause accidents when ice builds up) are never diagnosed or reported to authorities unless serious and/or repeated accidents occur. Accordingly, existing apps are inadequate and unsuitable for any system that requires trusted and verified information for re-routing drivers, for example. Furthermore, such systems are not suitable semi-/fully-autonomous vehicles as transportation threats cannot be provided fast enough to be utilized by a module that controls and/or monitors the dynamic driving task.

SAFENETS differs from existing methods, because SAFENETS can use vehicles as mobile sensors, without involving driver, to gather necessary sensor data for all potential threats. SAFENETS is also unique in the way it processes the vast amount of threat detection data generated by multiple vehicles. While the exact implementation involves multiple functional modules (e.g., for data pre-processing, conditioning, data association, etc.), one embodiment of SAFENETS may utilize a concept referred to as evidence filtering (which combines and filters information in a single operation) for threat identification. Threat management is also unique as one embodiment of SAFENETS utilizes several data association methods to track and manage partial threat detections in order to track the evolution of threats and threat zones over time.

While the technology is described for road situational awareness, other applications for SAFENETS paradigm can be found in defense domain, air travel and even in social threat detection and management situations.

Defense Domain:

In battlefield situations, especially in hostile territories, learning terrain threats and recurrent hazards, natural or otherwise, is an important feature for mission planning. While the road hazards experienced by military vehicles are very different from hazards experienced in civilian modes of transport, appropriate adjustments can be made to threat detection modules to identify different types of terrain hazards as applied to military vehicles. These data can be used to populate a terrain threat database automatically, and the database can be used for mission planning. The threat detections can also be used to warn nearby vehicles and/or reroute them automatically in response to impending dangers.

WMD/Chemical/Air-Pollution/Sea-Pollution:

The threat detection and type of threat detected by SAFENETS can be generalized by utilizing different sensor modalities and sensor types. For example, with the emergence of smart-city sensing, DARPA smart-plants for detecting chemicals, and programs such as DARPA's SIGMA and SIGMA+, technological capability for ubiquitous detection of various types of 'threat signatures' will become available. DARPA smart-plant sensors, for example, are described in "*DARPA seeks 'smart plants' to protect soldiers*," Michael Peck, Defense Systems, Dec. 7, 2017, available at (https://defensesystems.com/articles/2017/12/07/darpa-plant-sensors.aspx), the entirety of which is hereby incorporated herein by reference. One can then use SAFENETS, very similar to the embodiments described herein in the context of transportation networks, in order to make use of partial and asynchronous event detections for automatic identification hazards, their severity and evolution along with methods for reporting the hazards to relevant users.

Social Threat/Hazard Alert Systems:

SAFENETS can also be extended for use for event and intent detection via crowdsourcing. For example, an interface for SAFENETS data input can be developed via a tweet processing system that is tuned to detect tweets related to various types of dangers (there are publications along the lines of using tweets to identify earthquakes in Japan). The input stage can be configured to identify the location of the sensor (i.e., the device used to tweet), time and context in reporting partial threat detections to SAFENETS system. While individual reports may not carry much information, as is the case of one embodiment applied to road networks, one can utilize SAFENETS to combine these reports methodically to identify threats, their location, and their severity.

Components of the SAFENETS Embodiment System

The principal components of SAFENETS are shown in FIG. 1A and are listed below:

(1) Hard Sensor Data Acquisition Block: This interfaces the physical world with SAFENETS via associated signals, such as 3-axis acceleration, temperature, location, sound, moisture. A second embodiment could be a dedicated sensor board and processing unit. In another embodiment, this block resides in the vehicle, where built-in vehicle sensors are used for data acquisition either in conjunction with an available processing board or a retrofitted unit that interfaces with acquired data streams (e.g., via CAN bus). Minimum requirements are a GPS unit and INS sensor suite (i.e., 3-axis acceleration, 3-axis gyro) that has a dynamic range of at least −1.5 g to 1.5 g for all three components and a resolution of at least 8 bits. Sampling rates should be sufficiently high to avoid aliasing. In the case where no sound is acquired, sampling rates of 10 Hz would suffice, for example.

(2) Pre-processing and Event Detection Block: There are several components within this block: low pass filtering for noise reduction, vehicle suspension dynamics inversion and scaling with respect to a nominal suspension system, trigger signature detection, as well as feature detection algorithms. Acceleration signal signature for triggering the detection of an event can take multiple forms, such as (i) an oscillatory pattern passing a threshold on RMS acceleration, (ii) signal exceeding a threshold in one or more acceleration dimensions (e.g., high values on x-y for evasive maneuvers) or (iii) high power short-term events. Vehicle suspension system inversion and normalization is helpful to account for different suspension stiffness between vehicles and to improve system performance (in terms of detection rates and threat classification accuracy).

(3) Communication Trigger Block: Communication from the vehicle to SAFENETS server (either centralized or distributed) can be triggered via two primary, alternative mechanisms: (i) a trigger signal as described in (2) identifies a hazard or potential threat, or (ii) a vehicle approaches a previously identified threat or threat zone that is communicated by the server to the vehicle. In the case of (ii), in order to validate the detections, the server can automatically gather more information by requesting that vehicles (or cell phones therein) approaching the threat zone gather sensor data to evaluate presence or absence of threats.

(4) Display of Local Threat Map: This is a selected view of the global threat map generated at the server in (8). The content displayed is dependent on the current physical location of the participating vehicles, where the features of the local threat map can be controlled via the display setting block (6). However, the content distributed to a SAFENETS user is dependent on the type of user and subscription privileges. The display in general shows upcoming threat location, severity, and type of threat.

(5) Actions and Actuation Block: The upcoming threat locations, depending on type and severity of the threats generate recommendations regarding actions to take. The exact nature in which these actions and recommendations are handled will depend on the type of embodiment. In one basic scenario wherein SAFENETS is used via a smartphone, these recommendations will include safety suggestions such as speed recommendations and lane changes. In another embodiment, wherein SAFENETS interfaces with a navigation system, alternative routes may be generated based on the criteria set for the navigation (i.e., fastest, shortest-path, minimum fuel usage, etc.). In another embodiment, this block can also interface with vehicle systems to adjust vehicle parameters automatically, such as by adjusting suspension stiffness for improved ride comfort, safety, and fuel economy.

(6) Display Settings: Display settings can be chosen by the motorist in each vehicle, and threat information that is for display may be filtered (selected) by distance, type, and severity. Other display settings, such as sound notification, color encoding of threats, etc. may also be chosen by the user.

(7) Threat Tracking: The threat tracking block can implement all functionality for managing partial detections to threat identification, their tracking and management. At its most basic form, one embodiment implements the threat tracking block via a database that maintains detected threats, along with their location, severity and other parameters necessary for creating a global threat map in (8). The database entries may be managed via a set of rules (e.g., for adding/removing entries), probabilistic belief revision mechanisms or other techniques that enable maintaining an updated list of entries that are compliant with an incoming set of detections.

Figure 2:
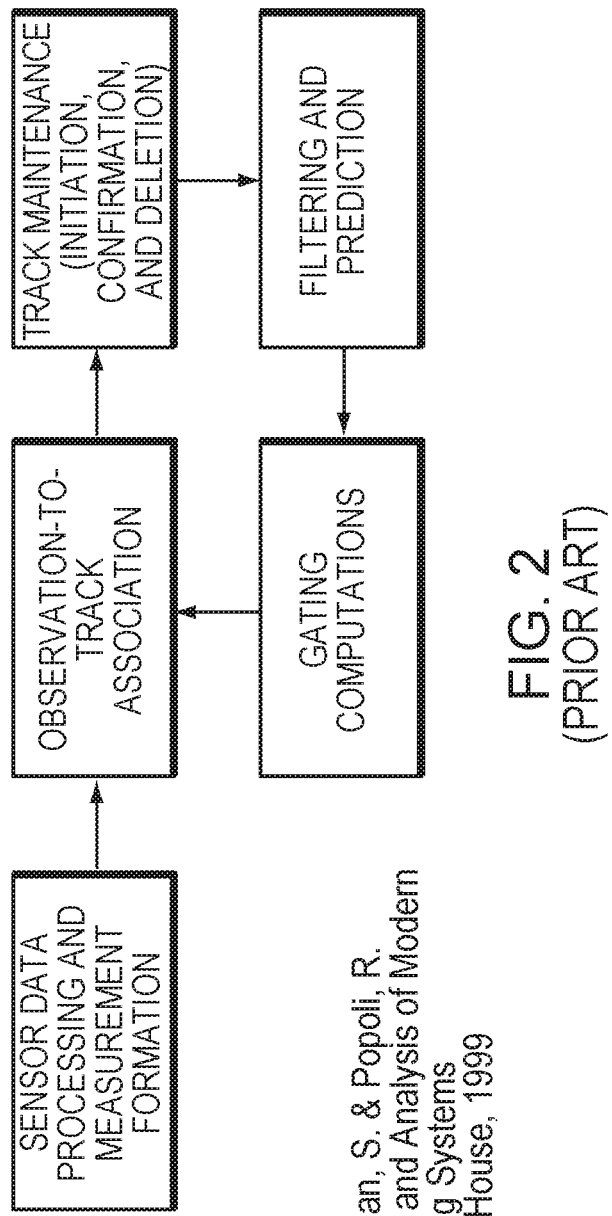
FIG. 2 (prior art) is a block diagram illustrating basic components of a conventional multi-target tracking (MTT) system illustrating sensor data preprocessing and primary tracking tasks, such as gating, measurement to track association, and track maintenance. (Blackman, S. & Popoli, R., *Design and Analysis of Modern Tracking Systems*, Artech House, 1999.)

A more comprehensive and scalable embodiment for obtaining threat tracking functionality can be implemented via a modified multi-target tracking (MTT) system. See FIG. 2 (prior art) for an example, conventional MTT system. Here, sensor data processing and measurement formation block can process potential threats reported by SAFENETS participants. The objective of this block is to take into account various aspects related to sensor data and form normalized measurements that can be utilized for threat detections. The observation-to-track association block can implement necessary functionality for, first, identifying the type of threat that may have generated the measurements (in previous block) and then, second, associating those measurements to existing threats or creating new threats.

The track threat maintenance block implements the functionality for initiating, confirmation and deletion of threats based on the information generated in the previous block. Filtering and Prediction block implements functionality for filtering potential threat signals and also prediction of their future status. To accomplish this, first-order update equations are used with one update equation per potential threat. While updating, fusion, and filtering of threats may be combined in other embodiments as put forward in previous papers, this embodiment can mostly use first-order updates in time. Previous papers include Garg, V. K. & Wickramarathne, T. L., Ubiquitous Sensing for Enhanced Road Situational Awareness: A Target-Tracking Approach, *Proc. IEEE Int. Conf on Intelligent Transportation Systems (ITSC)*, 2018, 1-5; A Cloud-based MHT Framework for Tracking Spatio-Temporal Phenomena in Ubiquitous Sensing Environments, *Proc. Int. Conf on Information Fusion (FUSION)*, 2018, 1-5; On Multi-Sensor Radar Configurations for Vehicle Tracking in Autonomous Driving Environments, *Proc. Int. Conf. on Information Fusion (FUSION)*, 2018, 1-8; and Wickramarathne, T. L.; Garg, V. K. & Bauer, P. H., On the Use of 3-D Accelerometers for Road Quality Assessment, *Proc. IEEE Vehicular Technology Conference (VTC-Spring)*, 2018, 1-5; all of which are hereby incorporated by reference herein in their entireties.

Since the server has a global view of the threat, the server can use additional information not originating from vehicles, such as weather at the threat location, terrain, lighting and visibility, as well as participation ratio of threat reporting at a given site. Update equations for the following threat types may be implemented: DB (debris), PT (potholes), WT (water on road), IC (Icy surface), AN (animals or humans on road), OB (obstruction or accident), HS (high speed oncoming traffic), ED (erratic driver), HB (high beam oncoming traffic), IN (dangerous intersection), LV (limited visibility), UK (unknown threat). Each threat type may have an assigned update equation of the form:

$$PT(n+1)=aPT(n)+b_1f_1(n)+b_2f_2(n)+ \ldots +b_kf_k(n) \text{ or}$$

$$WT(n+1)=aWT(n)+b_1f_1(n)+b_2f_2(n)+ \ldots +b_kf_k(n)$$

for potholes or water on road, respectively, where all coefficients are non-negative and sum to 1, i.e., a+b1+b2+ . . . +bk=1 and the above update equation is for the example of a pothole. The driving inputs fi(n) can be any of the inputs generated by the sensors of the vehicles or the fusion machine using general location data such as weather. The presence of all features may also be normalized to the range between 0 and 1. This is similar to the probabilities, beliefs, or plausibilities described in "*Evidence Filtering*," D. Dewasurenda et al., IEEE Transactions on Signal Processing, Vol. 55, No. 12, December 2007, which is hereby incorporated by reference herein in its entirety. In case spatiotemporal dependencies like in the case of a moving threat, e.g., ED, HB, etc., are to be captured, the higher-order update equations in multiple dimensions may be employed. In the above equation, n is event-based (i.e., it does not correspond to discrete time, but instead to an event). While gating is used for excluding observations based on location in MTT systems, the functionality implemented in SAFENETS is more general. In one embodiment, the gating block functions to exclude erroneous and spurious detections based on both target type and location predictions in conjunction with exogenous data on the locality (e.g., known abnormalities).

(8) Global Threat Map: A global threat map entails all threat locations described by threat types, threat severity, etc. Generation of global threat map will also take into account various types of external data, such as geography, known locations, priority areas, and other specified parameters for identifying the threat severity and their importance in the map. For example, a few smaller but fast decaying potholes near a hospital may be considered of greater urgency than a larger pothole in a rural road.

The global threat map block may also implement functionality to allow different map configurations, granularity, etc. One especially useful block of the threat map generation involves a hierarchical threat storage data structure that allows for (a) quick retrieval of threats for a certain local area (to be used in local threat map) and (b) inferences to be generated for threats or threat zones at multiple resolutions. For instance, data may be stored in a hierarchical structure wherein the threats are organized based on their location in a Military Grid Reference System (MGRS) and location accuracy of the threat.

(9) Local Threat Map: This is a partial threat map that can be communicated to each motorist depending on vehicle position.

Figure 1B:
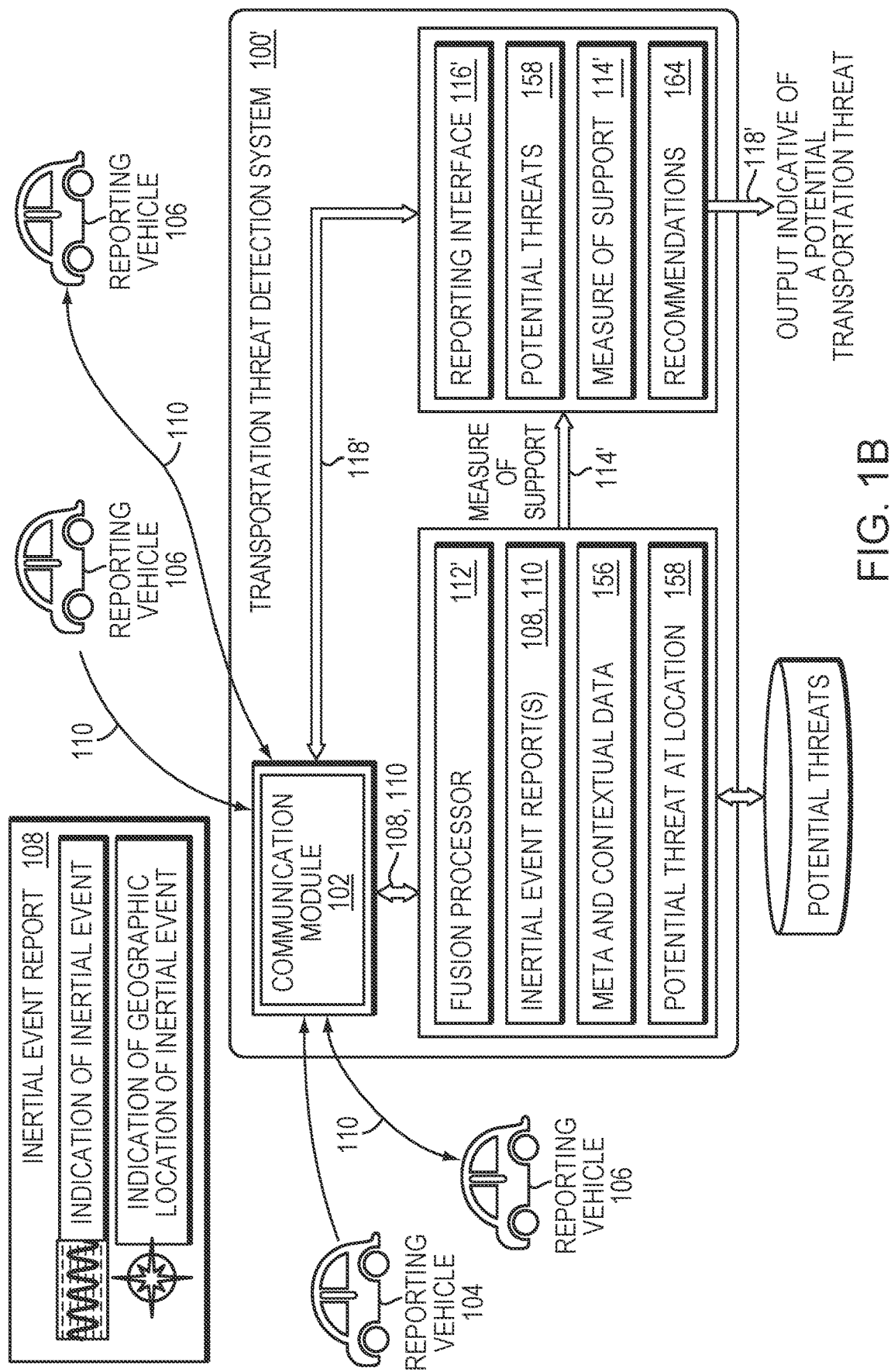
FIG. 1B is an illustration of information flow between the main components of an embodiment transportation threat detection system.

FIG. 1B is a schematic block diagram illustration of information flow between the main components of an embodiment transportation threat detection system, wherein inertial event reports 108 and additional inertial event reports 110 coming from multiple reporting vehicles 104 and 106, respectively, are handled by the communication module 102. Operation of a fusion processor 112' and reporting interface 116' are also illustrated. In particular, bi-directional information flow 118', which includes output indicative of a potential transportation threat 158, is illustrated between reporting vehicles 104, 106 via the communication module 102. In this manner, it is illustrated that in some embodiment systems, the communication module 102 may both receive inertial event reports from reporting vehicles and also communicate output 118' indicative of potential transportation threats 158 to various vehicles, including to the reporting vehicles 104, 106, optionally, which provide the initial inertial event reports 108, 110, respectively. The elements of FIG. 1B are described more generally in connection with FIG. 3A, for example. The elements of FIG. 1B, where prime (') indicators are included, may be considered to be variations of more generalized elements similarly numbered without the prime marks as found in FIG. 3A.

The fusion processor 112' particularly receives the inertial event reports 108, 110 from the vehicles 104, 106 via the communication module 102. The fusion processor 112' may also receive, or produce, meta-data and contextual data 156 based on the inertial event reports 108, 110. Information regarding potential threats at locations 158 may also be produced at other sources or received by the fusion processor 112' from other sources.

A measure of support 114' is provided by the fusion processor 112', and the measure of support 114' may include any of the elements 108, 110, 156, 158 received by, or produced by, the fusion processor 112'. The reporting interface 116' renders output 118' that is indicative of one or more potential transportation threats 158 as a function of the generated measure of support 114', where the output 118' in FIG. 1B includes the measure of support 114' and recommendations 164. As already indicated, this output 118' may be provided to reporting vehicles (or two mobile devices therein), for example, via the communication module 102.

Figure 1C:
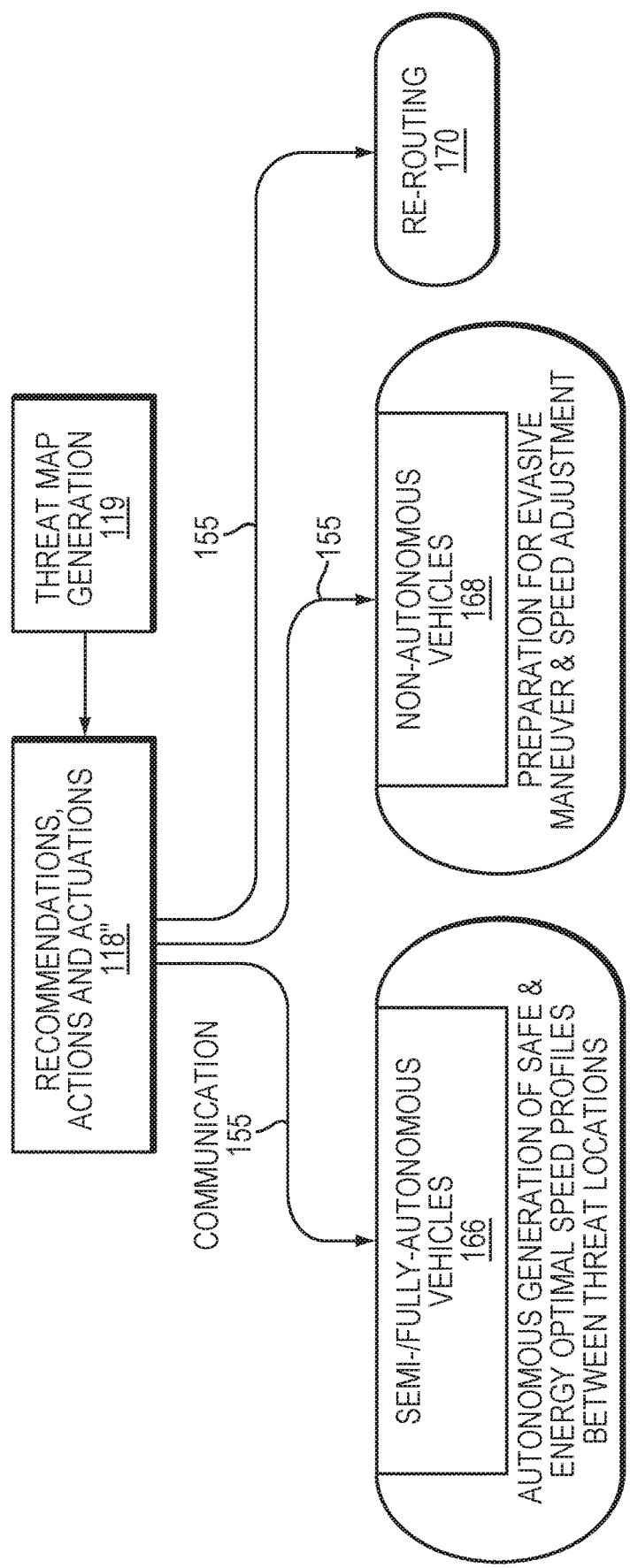
FIG. 1C is a diagram illustrating how recommendations generated by and embodiment transportation threat detection system can be used by different entities.

FIG. 1C is a diagram illustrating how recommendations, actions, actuations, etc. 118" that are generated by a transportation threat detection system, such as the transportation threat detection system 100' illustrated in FIG. 1B, can be used by different receiving entities that receive the output 118' illustrated in FIG. 1B. In particular, via communication 155 that may include any means of connectivity 154 as described in connection with FIG. 1A, the output 118' may be received by semi-autonomous or fully autonomous vehicles 166. The vehicles 166 may use these recommendations for generation of driving profiles that are safe and or energy optimal. For example, in one sense, a driving profile may be energy-optimal if it indicates that a car should slow down in advance of arriving at a red light to save fuel, for example.

The recommendations, actuations, and actions 118" may also be received at a non-autonomous vehicle 168. Non-autonomous vehicles 168 may receive these recommendations and alert a human driver in a timely manner to prepare for evasive maneuvers or speed adjustments that may be needed to avoid or mitigate transportation threats, for example. It should be understood that receipt of the information 118", whether by vehicles 166 or by vehicles 168, may be by means of a cell phone or other mobile communication device present in the vehicles 166, 168, for example. Receipt of the information 118" by the vehicles does not necessarily imply that the vehicles can receive this information, but rather that the information is received at the vehicles, by means of the vehicles themselves, or by means of mobile devices present in the vehicles.

The information 118" may also be received at a rerouting service 170, which can be a traffic re-routing service, for example. The re-routing service 170 may use such information for traffic planning and or signaling, and the recommendations can be utilized for achieving optimal operations for some established measure, such as re-routing of traffic, for example. Also illustrated in FIG. 1C is a threat map generation 119 as an input to the recommendations, actions, and actuations information 118". The threat map generation 119 may be performed by the fusion processor 112' illustrated in FIG. 1B, by a distributed processing environment, or other means available to those of skill in the art. Thus, both the information 118" and the threat map generation 119 may be provided by the fusion processor 112'. Alternatively, the fusion processor 112' may be in communication with a separate processor or communication module that generates the information 119, and this information may be received via the communication module 102, for example, as illustrated in FIG. 1B.

Advantageously, embodiment transportation threat systems can use input only from acceleration sensors and GPS. Advantageously, this information can be supplied exclusively from mobile phones that are present in vehicles, for example. Mobile phones may be mounted in a fixed orientation and position in a vehicle, for example, in order to obtain and maintain reliable and meaningful acceleration readings. Sophisticated sensor suites that are vehicle-based are not needed and are optional. One technical challenge with this approach is that an unstable feedback loop may be generated if the acceleration readings of the sensors are not appropriately scaled with speed. This leads to speed and threat oscillations due to the fact that a back-reported threat leads to lowering vehicle speed, and lowered vehicle speed leads to lower longitudinal and lateral acceleration values. These lower values are then reported to the fusion center, and this may lead to a threat reduction, which in turn is communicated back to the next driver, leading to higher speeds and higher acceleration values again. The following description sets forth one method employed in embodiments to mitigate or avoid feedback loop oscillation in speed or threat levels.

Figure 1D:
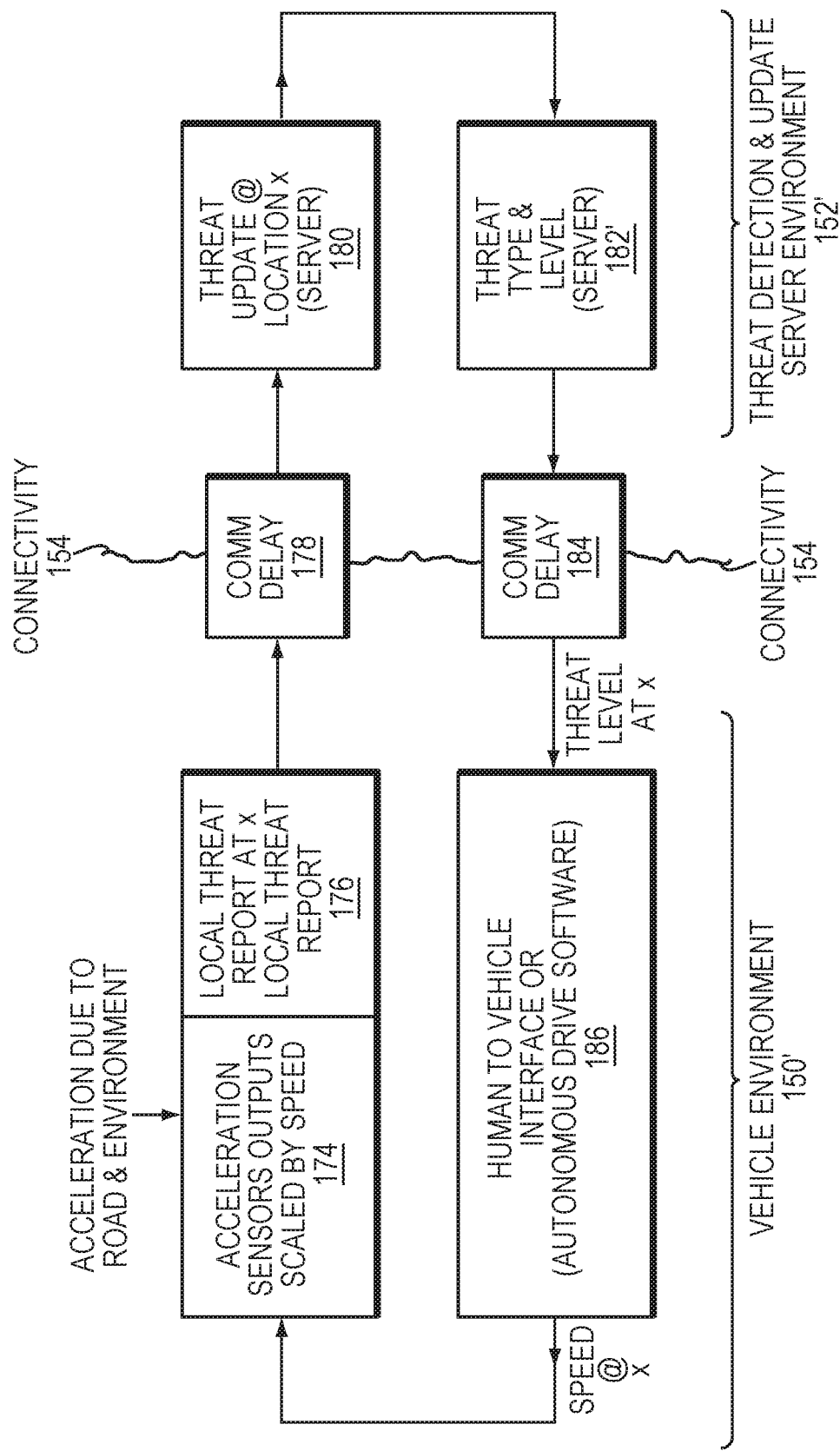
FIG. 1D is a diagram illustrating the feedback loop and interplay between accelerometer sensor measurements, transportation threat detection and vehicle speed.

FIG. 1D is a block-flow diagram illustrating the feedback loop and interplay between accelerometer sensor measurements, transportation threat detection and vehicle speed. This system describes the feedback loop that may be created by informing motorists about threat conditions through output 118', the motorist reacting to it, and the effect of this reaction on sensor readings at the threat locations and subsequently on threat reports. The two blocks 180, 182 on the right of FIG. 1D are the processes that happen in a server environment 152', namely threat construction and threat mapping (intensity, type, location) and communication back to the motorists via communication interface, respectively. The block 186 on the lower left of FIG. 1D is a SAFENETS-human interface (or SAFENETS—Autonomous system interface), which models the reaction of a drivers in the threat zone to announcement of an upcoming threat. The output of this block 186 is an updated speed (typically a lowering of the speed). On the other hand, the block 174 on the upper left models the effect of the speed change at the threat zone to sensor readings and in a second block 176, threat reporting. Sensor readings are speed adjusted to avoid threat oscillations. This takes into account all vehicles in a particular threat zone, not just a single vehicle. Threat oscillations can occur if speed scaling of the sensor readings is not be done or if scaling is done incorrectly.

In greater detail regarding FIG. 1D, at the block 174, acceleration sensor outputs are scaled to speed of the vehicle. Acceleration sensors record 3-axis acceleration, and these can be scaled by vehicle speed to account for differences recorded by sensors due to vehicle speed. For example, if the vehicle hits a bump at a higher speed, the impact will be felt more than it would be if the vehicle hit it at a slower speed. Thus, the measurements should be scaled to take speed into account in order to discern the difference between an acceleration measurement caused by a potential threat and a measurement made strong due to vehicle speed. At block 176, the scaled acceleration measurements are used to determine a potential transportation threat at a particular geographic location X.

At a block 178, there is communication delay between the time that a vehicle detect a transportation threat and a time that data the related inertial event report from the vehicle is processed at fusion processor in the server environment 152'.

At a block 180, a fusion processor updates threat information at the location X. The fusion processor computes the measure of support for the potential transportation threat at location X.

At a block 182, threat type and level are determined by the fusion processor to determine the type or types transportation threat or threats with which an inertial event report may be associated, as well as a severity. This may be based on measure of support and previously reported inertial event reports and other contextual/domain expertise data At a block 184, there is a delay between the calculation described above at block 182 and receipt of that information at a receiving vehicle or other entity.

At a block 186, there is an interface wherein a human, a vehicle interface, a cell phone, or a semi- or fully-autonomous drive system receives the threat information and severity. When the block 186 receives this information, it may either adjust speed or make another maneuver in response to the potential transportation threat information. This can be a human doing reacting, or it can be a semi- or fully-autonomous control unit making a decision to react.

In some embodiments, a approach to avoid threat oscillations, thus, is to scale accelerometer sensor readings with speed. The type of scaling depends on the direction of the acceleration information. As an example, longitudinal acceleration measurements may preferably be scaled quadratically with speed. In one embodiment with only a 2-D or 3-D accel sensor and GPS, lateral and longitudinal acceleration values may be scaled to maintain loop stability.

In the above manner, for example, various embodiment systems enable detection and processing of potential transportation threats by processing acceleration signals. Recommendations may then be sent to the receiving vehicles (including to communication devices the receiving vehicles, for example) in any manner described herein to make changes to vehicle speed or maneuvers to react to potential threats. These maneuvers can then alter what is recorded by acceleration sensors on board the receiving vehicle. For this reason, a second receiving vehicle approaching a transportation threat location and reacting based on recommendations thus provided may observe and/or report a set of acceleration sensor outputs that differ from those experienced by vehicle(s) previously encountering the potential threat. The feedback loop illustrated in FIG. 1D may be advantageously employed in various embodiments, in a fusion processor, for example, in order to mitigate the negative effects of corrective feedback.

Relationship Between Components:

The relationship between the units (blocks) described above is further described hereinafter. Unit 1 uses data from a variety of sources. In this embodiment, GPS and INS (3-axis acceleration and gyroscope) data are employed as a minimum, but unit 1 can also use data from in-vehicle sensors. This unit utilizes signal-dependent sampling rates to perform data acquisition. After data acquisition, sampling, and quantization in unit 1, unit 2 then preprocesses these data to make them more useful and remove noise. The preprocessed data are then sent to unit 3, which analyzes the data for communication triggers (i.e. events that could be of interest). Unit 4 also provides these data to unit 3, based on previously determined threats. Unit 3 then transmits the preprocessed sensor data to unit 7 on the central server or cloud side, assuming such a transmission is triggered.

The threat tracking unit in 7 fuses the transmitted data from vehicles at the same area or nearby areas together with non-vehicle data such as visibility, time of day, etc. It also updates threats using the new information and filters it at the same time, thus generating threat estimates at each location that contain type, intensity, location, etc. Based on the fusion results in 7, a global threat map is constructed for all areas that show potentially dangerous threats. Unit 9 then selects the appropriate threat map for all participants and sends it back to the user. In unit 4, a local threat map is displayed and updated. Unit 5 uses this information to issue threats to the driver via audio or visual information.

How Embodiments can Function

The described SAFENETS embodiment system includes two major groups of components: the vehicle-side components and the central processor/decentralized processor fusion-node components. The components on the vehicle side perform data acquisition, preprocessing, and analysis for determining whether currently acquired data are important and should be sent to the fusion node or whether these data should be discarded. On the fusion node side, data are received from many vehicles that experience a potential threat, i.e., a send-trigger occurred. Via a suite of filtering, data association, and post-processing methods, these data are fused and updated by location (vehicle data from the same location are combined and filtered). This process also determines the threat type, their severity and confidence in the determination process. The process results in a set of locations, for which threat levels are computed by taking previous and new data into account, thus updating the threat type and value.

With these threat data in place, a global and dynamic threat map can be constructed, and this map can show the location of threats, the threat types with the highest probability, as well as threat severity. These data are then used to generate information as relevant as required for different types of SAFENETS participants. For example, a motorist can then be provided with a dynamic local map, where impending threats for a given area of town are shown via visual and/or audio warning signals as the motorist approaches the given area. Also, from the vehicle side, a send-trigger in each vehicle can occur as the vehicle gets closer to a threat zone, regardless of whether a threat event is detected by a vehicle or not. These data are utilized for threat confirmation, type verification, participation rate determination and adjustment of detection confidence levels.

How to Make Embodiments

In one form, an embodiment includes two different physical devices: (i) a smartphone with a SAFENETS app and (ii) a server. For (i), any smart phone (e.g., Android or i-phone) can be used. The app would in its most basic form utilize the INS and GPS sensors that come standard with every modern smartphone. Units (1)-(6) can be implemented in the SAFENETS app, where certain algorithms may run in the smartphone, the server or a combination of both. The SAFENETS App can communicate with the server via standard data communication protocols utilized in client server configurations. Units (7)-(9) can all be implemented on the server, which can be centralized or decentralized. The server-side functionality can be implemented via several functional blocks that process incoming data in real-time or nearly real-time and also perform stored batch processing for offline tasks.

In a more sophisticated embodiment, built-in sensor suites of modern vehicles, together with either navigation systems, add-on GPS devices, or a SAFENETS hardware unit, can acquire necessary threat detection and location data. Vehicle-to-SAFENETS server communication can be implemented via a separate communication device built into SAFENETS hardware unit, a smartphone that connects to SAFENETS hardware unit, a cellular connection built into the vehicle, or any other latest V2X communication mechanism, for example.

How to Use Embodiments

Embodiments can be used by every motorist on a highway or street that has some cell phone coverage. In a basic embodiment, the motorist would put the cell phone into a special cell phone holder that fixes the position of the phone, i.e., does not allow any movement relative to the car. The motorist can then start the app and start driving. The cell phone can connect to the server and provide threat information to the driver in form of a map or audio warning signals, announcing upcoming threats, severity, type, etc. Therefore, the system is typically used as safety enhancing traffic tool, but it can also be used by municipalities and other agencies to improve traffic and road infrastructure by detecting recurrent threats of the same type and location, i.e., potholes, occluded street sign, dangerous intersections, etc.

Other use environments for embodiments outside the realm of road traffic systems include military applications, air travel, and sea travel. As an example, in military applications, SAFENETS can be used to mark recurrent and dynamic threats of various types, including rough terrain, enemy fire, flooding, etc. In air travel, the system can be used to predict bird strikes, turbulences, difficult approaches, sand storms, side winds, etc. Another use includes crowd-sensed threat/hazard alert systems, such as flood-warning or earthquake alerts.

Figure 3A:
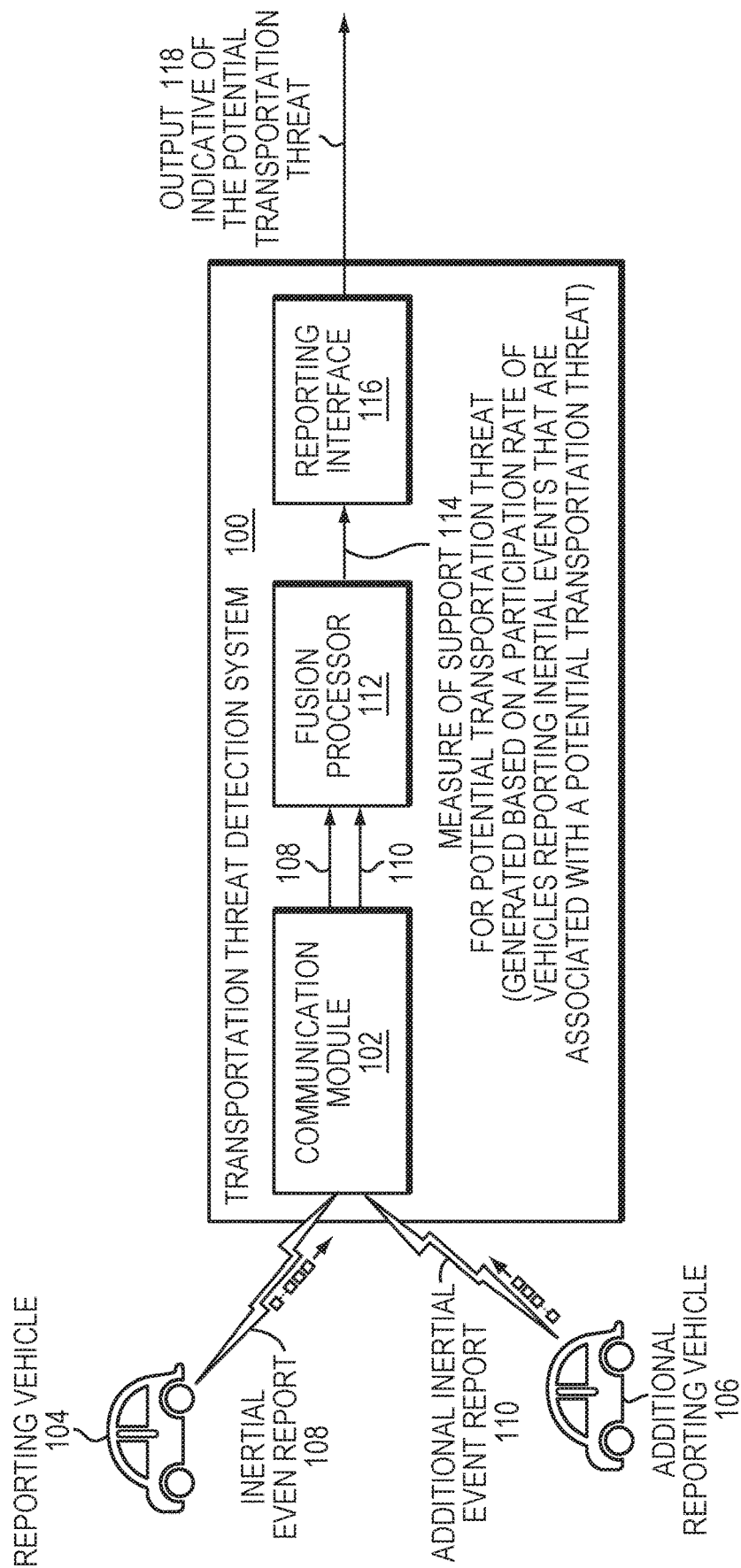
FIG. 3A is a schematic block diagram illustrating a generalized embodiment transportation threat detection system.

FIG. 3A is a schematic block diagram illustrating a generalized embodiment transportation threat detection system 100. FIGS. 1A-1D and 3B should be understood to be exemplary embodiments within the scope of the generalized embodiment system 100 of FIG. 3A. FIG. 3A also illustrates communication of the system 100 with reporting vehicles 104 and 106 that can be configured to interface with the system 100. As illustrated in FIG. 3A, the transportation threat detection system 100, which may be hosted at a centralized server or in a decentralized service system, includes a communication module 102, a fusion processor 112, and a reporting interface 116.

The communication module 102 is configured to receive an inertial event report 108 from the reporting vehicle 104, and this reporting may be via a cell phone that is being carried in the vehicle 104, or by other means, preferably wireless communication means. Alternatively, the report may come directly from a communications interface of the car. The communication module 102 is further configured to receive one or more additional inertial event reports 110 from one or more additional reporting vehicles 106. While one reporting vehicle 106 is illustrated in FIG. 3A, an actual number of reporting vehicles from which the communication module may receive inertial event reports is not limited. The inertial event reports 108 and 110 include, at a minimum, an indication of an inertial event from an inertial sensor at the reporting vehicle, and also an indication of a geographic location associated with the inertial event.

An inertial event can result from any movement of the car that may be unusual or noteworthy, such as slowing down unexpectedly, accelerating unexpectedly, swerving unexpectedly, or a sudden deceleration that may indicate a crash or a cautionary action by a vehicle operator to avoid an obstruction in the road, for example. Where this inertial event report is received via a cell phone in the car in the vehicle 104, the report may be based on a software application, such as a SAFENETS application described hereinabove, running on the cell phone. The application may receive inertial data, such as from accelerometers or gyroscopes or both, that are on board that are built into the cell phone. Furthermore, as will be understood, the cell phone itself may include a GPS receiver that can provide an indication of a geographic location associated with the inertial event.

As used herein, to "receive an inertial event report from an inertial sensor at the reporting vehicle" includes, as examples and not by way of limitation, either receiving the report directly from a cell phone being carried in the vehicle, receiving the report from an onboard, built-in vehicle system, etc. The cell phone or vehicle may further report, in an inertial event report, other data from other sensors. The one or more additional inertial event reports 110 can include similar or different data.

The fusion processor 112 is configured to receive the inertial event report 108, and any additional inertial event reports 110 via the communication module 102. The fusion processor 112 can associate the inertial event report(s) received with a potential transportation threat, consistent with the inertial event report and at the geographic location associated with the inertial event being reported. The fusion processor 112 is further configured to generate a measure of support for the transportation threat potentially existing at the geographic location. This measure of support, which may be a probability or other measure, for example, is based on a participation rate generated using any additional inertial event reports 110 that may be received from list respective additional reporting vehicles 106. As an example, where the fusion processor 112 analyzes only one report of a car swerving, as indicated by cell phone data, the fusion processor 112 may assign a low measure of support for a pothole potentially existing in the road existing, for example. However, if additional inertial event reports from other vehicles report indicate similar swerving at a similar geographic location, then the fusion processor 112 may assign a greater probability or other measure of support for the pothole potentially existing at the location.

For purposes of determining a participation rate, there should be at least two potential reporting vehicles. More specifically, in relation to calculating a participation rate for a given potential transportation threat at a given location, there will be a total number of potential reporting vehicles N (where N≥2) (vehicles that are (i) equipped and configured to report the threat to the threat detection system and (ii) that encounter (e.g., pass) the geographic location associated with the potential threat). There will also be a number of actual reporting vehicles n (where 0≤n≤N) (i.e., vehicles selected from the N potential reporting vehicles that actually report the threat, or equivalently, vehicles that send an inertial event report that is associated with the given threat). "Participation rate," as used herein, is any function of N and n. In one example embodiment system, a participation rate is defined as a simple ratio of the number of actual reporting vehicles n actually reporting the threat (e.g., n=2) to the total number of potential vehicles passing the threat (e.g., N=5), resulting in n/N=2/5. In another embodiment, participation rate is a more complex ratio of n and N, with n at least appearing in the numerator, and N at least appearing in the denominator of the more complex ratio. In another example, the participation rate is a more complex function of N(t) and n(t), such as a time-filtered ratio or a polynomial function of N. In preferred embodiments, N(t) and n(t) are low-pass filtered in order to obtain a slowly varying estimate of participation rate.

Measures of support for potential transportation threats may be generated in a fusion processor based, at least in part, on a participation rate, where this participation rate may be calculated based on two or more total potential reporting vehicles having encountered a given geographic location of a potential transportation threat. The example equation given above for potholes, namely $$PT(n+1)=aPT(n)+b_1f_1(n)+b_2f_2(n)+ \ldots +b_kf_k(n),$$

is a measure of support for the pothole transportation threat, for example, existing at a given geographic location. In this example, the threat equation coefficients $a, b_1, b_2, \ldots b_k$ can be related to the participation rate, such as being functions of the participation rate. In one example, one or more of the coefficients may be respective linear functions, nonlinear functions, time-decaying functions, or polynomial functions, of the participation rate. In view of this specification, a person of ordinary skill in the art of transportation modeling will be able to determine appropriate form for participation rates and threat equation coefficients for any given threat by appropriate analysis and modeling of different types of threats.

In particular SAFENETS embodiments, participation rate can be defined as a (filtered) measure of the ratio of vehicles (at a particular threat location) that report a measurement event (through an event-triggered communication) divided by ALL vehicles that use SAFENETS and pass that location. This participation rate (filtered or not) can impact the threat update equations, such as those described herein, especially the coefficient that determines bandwidth of the update equation. For example, in the example PT equation described hereinabove, a large coefficient a may be chosen where the participation rate is low in order for the threat levels to stay approximately constant over time. If the participation rate is very high, one can afford a small value of a that results in faster threat tracking and fewer delays. FIGS. 10A-10B and 11A-11B illustrate this effect. If a threat is not experienced (determination of "miss," or "no") [see FIGS. 10B and 11B for "hit or miss" (yes or no, respectively) determinations, for example], the computed threat level shows an immediate reaction and declines. Therefore, in the example FIGS. 10A-10B and 11A-11B, a small, recursive coefficient "a" was chosen to illustrate this effect.

In various embodiments, the participation rate can be particularly useful measure for the functionality and health of a threat detection system. A correctly functioning system will often show reduced participation rates and/or threat levels after a sufficiently long time period has passed, which can be due to motorists becoming aware of the threat. Some threats can always have large participation rates, but after threat feedback to drivers, the threat intensity can be lower (as is the case for, e.g., a speed bump in the road or large debris.) In other cases, such as a pothole or ice/water on the road, the participation rate and the threat levels (measures of support for the threats) can be decaying over time due to reduced speed and evasive maneuvers. Therefore, the participation rate itself can give important information on the type (and severity) of the threat and can even be directly included in the update equation as a driving input term, in addition to being related to one or more of the coefficients as noted above.

The fusion processor 112 outputs a measure of support 114 as described above. The reporting interface 116 is configured to render output 118 that indicates the potential transportation threat, the output rendered as a function of the generated measured of support 114. The output indicative of the potential transportation threat may be a warning signal, a local threat map, a global threat map, or other type of indication. The reporting interface 116 may be the same as the communication module 102, and the output 118 may be in the form of a wireless signal sent to one or more participating vehicles (or cell phones within the vehicles).

The fusion processor may be configured to distinguish between an inertial event caused by the potential transportation threat and an inertial event caused by a reaction of a receiving vehicle to the rendered output. When a motorist that is approaching a transportation threat, the motorist is alerted that the transportation threat is upcoming. After being alerted, the motorist may choose to slow down or to execute other evasive maneuvers as a matter of caution, before actually encountering the threat. If the vehicle in which the motorist is driving is also a reporting vehicle by means of a cell phone located in the vehicle, for example, then any evasive maneuver reported by the cell phone as an inertial event to a transportation threat detection system may be sensed and reported as a relatively less severe inertial event than if the motorist had not received advance warning. This could lead to increased vehicle speeds triggering again more severe threat notifications. Such an effect may be taken into account appropriately by scaling an input to the threat update equation by the speed v or by a function of the speed v. Therefore, the proposed method avoids threat notification oscillations that occur due to information feedback to the vehicles.

Figure 3B:
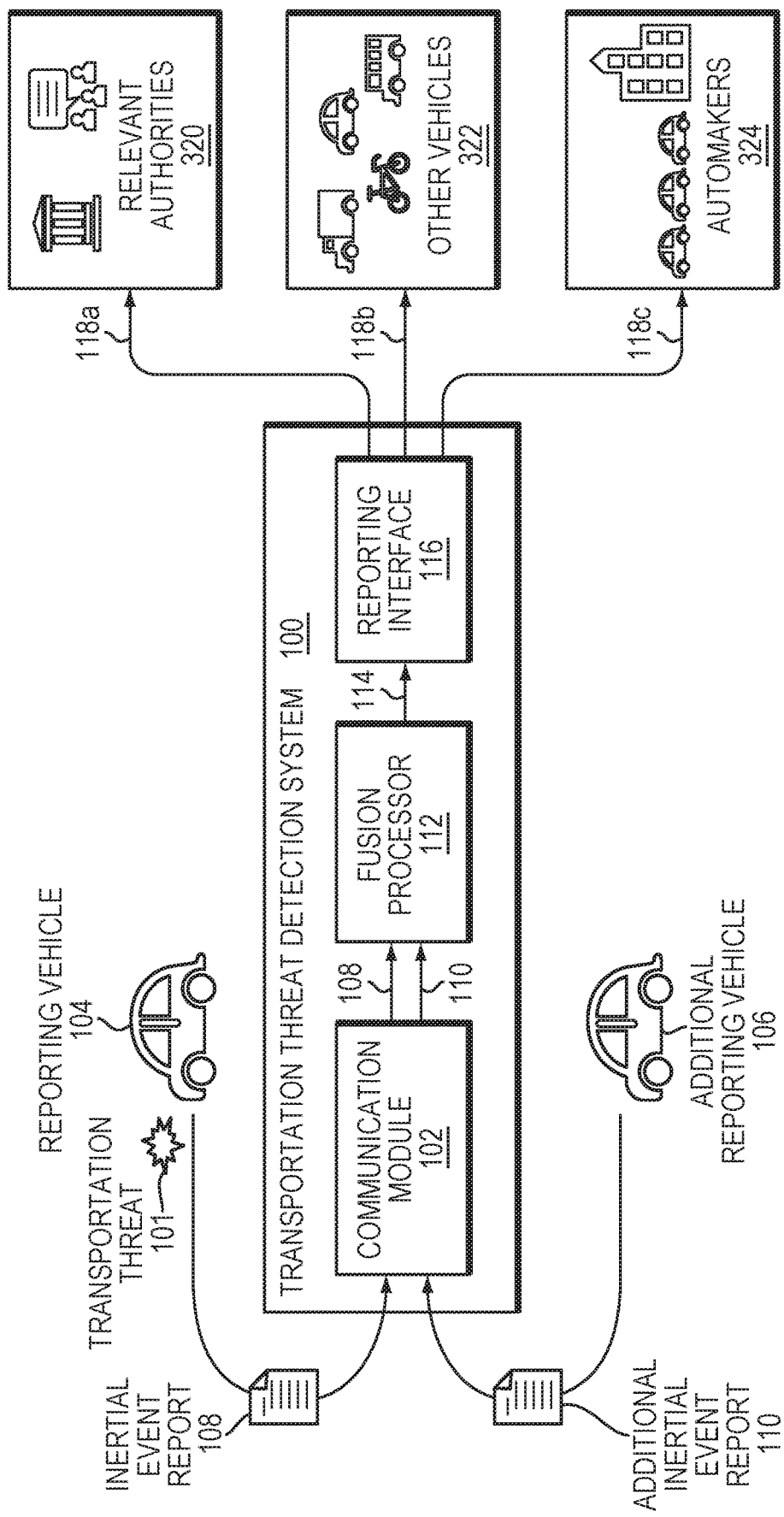
FIG. 3B is a schematic block diagram illustrating an embodiment transportation threat detection system similar to that of FIG. 3A, but also directing transportation threat information in different forms to various report receiving entities.

FIG. 3B is a schematic block diagram illustrating the embodiment transportation threat detection system 100 and system architecture as in FIG. 3A, but FIG. 3B also illustrates directing transportation threat information in different forms to various report receiving entities.

FIG. 3B is a schematic block diagram illustrating an embodiment transportation threat detection system similar to that of FIG. 3A, but also directing transportation threat information in different forms to various report receiving entities. In particular, the reporting interface 116 is configured to render output indicative of a potential transportation threat 101, in the form of output 118a, 118b, and 118c to relevant authorities 320, other vehicles 322, and automakers 324, respectively, through any available communication means, as described in connection with FIG. 1A. The outputs 118a, 118b, and 118c can be respective transportation threat reports including different respective contents that can meet the needs of the respective receiving entities 320, 322, 324.

In other embodiments, a transportation threat detection system may include other elements described herein in connection with other embodiments. It should also be understood that various embodiments may implement software functions and features described hereinafter in relation to simulation software testing.

Summary of Test Software Illustrating Functions of Various Embodiments

A vehicle may encounter many hazards any time it is put to use, which can lead to results varying from a simple gasp out of the driver's mouth to a multi-car pileup. Described hereinafter are two facets of mitigating the impact that hazards have on vehicular transportation: (i) creating an accurate simulation of a vehicle encountering various hazards on the road, and (ii) distinguishing what type of hazard a vehicle has encountered via impact or avoidance, for example. Various hazards considered include potholes, bumps, debris, ice, and water.

Using MATLAB® software, a first program was created to simulate multiple cars traveling down a stretch of road with a number of hazards randomly placed throughout the road. The program also tallies which vehicles hit which hazards. A second program is then used each time a vehicle passes a hazard, noting whether it is impacted or not, and it generates artificial vehicle sensor data as well as road conditions data that are used to determine, with varying confidence, what type of hazard was just passed. Each type of hazard has its own threat function structured as a first order update equation. In other examples nonlinear, higher-order update equations may be used. Ideally, a goal of the software includes that over time, the threat function for the type of hazard that was hit approaches a value of 1 while the functions for any other potential hazard types (transportation threats) being considered stay near 0.

Motivation for Software Simulations:

Embodiments can contribute to a future with safer roads. With upgraded cellular networks and more advanced vehicle communications in the near future, the ability of a vehicle to determine what type of hazard it has just encountered can greatly enhance safety. Vehicle-to-vehicle (V2V) and vehicle-to-infrastructure (V2I) communication can be greatly enhanced by this information.

Using embodiments, cars can tell each other where certain hazards are located and allow other vehicles to avoid impacting those hazards. Notifying vehicles of a patch of black ice, for example, can lead to the prevention of deadly accidents. Cities can instantly be notified when dangerous debris is spread across a highway lane. The exact location of every pothole in a city can be automatically stored, with each pothole characterized by a magnitude of severity. Giving a significant portion of vehicles on the road the ability to detect the location of hazards can significantly increase the safety of land transportation.

Use of lidar sensors, ultrasonic sensors, infrared sensors such as infrared thermometers, cameras, and stereo cameras as additional sensors, for example, is also encompassed by embodiments. In particular, the fusion processor 112 described above in connection with FIG. 3A, for example, may be further configured to generate the measure of support for the transportation threat potentially existing at the geographic location based further on information from a lidar sensor, an ultrasonic sensor, an infrared sensor such as an infrared thermometer, a camera, or a stereo camera device. One or more of these additional sensors or devices may be attached to, or form part of, a mobile communication device. Alternatively, these additional sensors or devices may be attached to, or form part of, a reporting vehicle. Raw, unprocessed information from these additional sensors or devices may be incorporated into an inertial event report received at a transportation threat detection system that is embodied in a server. As an alternative, the mobile device or reporting vehicle may process the information and/or fuse the information with inertial sensor information before reporting to the transportation threat detection system in the server. As a further alternative, the mobile device or reporting vehicle may provide raw or processed sensor information to the transportation threat detection system in the server or to a distributed processing environment for further use.

Advantages:

A key benefit of disclosed embodiments described herein over existing systems is that embodiments can utilize only vehicle accelerometer data with road condition and location data to detect and characterize a hazard after it has been impacted. In contrast, existing systems tend to implement sensors that seek to detect the hazard before the vehicle encounters it. Waiting to detect and characterize hazards impact allows the process to be done without any new technology in the car and is likely a more practical process; however, adding the technology to foresee upcoming hazards is potentially a safer solution.

Methodology and Results

Simulating Vehicle Trajectories with Random Hazards:

A first computer program simulates a vehicle traveling down a stretch of road with random hazards scattered throughout and determines when the vehicle hits each hazard. The path of the vehicle is a random sinusoidal signal, to simulate real-world oscillatory trajectories. The path is split into two lines, one representing the path of the tires on the left side of the vehicle and one representing the path of the tires on the right side. The central location of each hazard is randomly generated on the road. Each simulated hazard is also given a random width and length that fits into a specified range.

Figure 4:
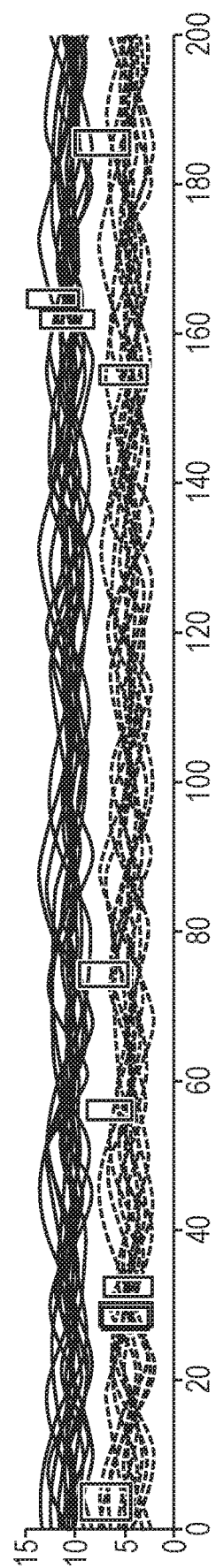
FIG. 4 is a graph illustrating results for a simulation of 50 vehicles and 10 hazards.
Figure 5:
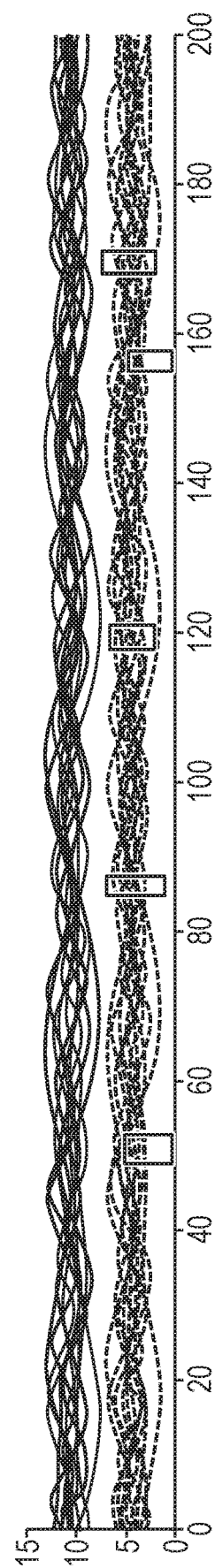
FIG. 5 is a graph illustrating simulation results for a set of 50 vehicles and five hazards.
Figure 6:
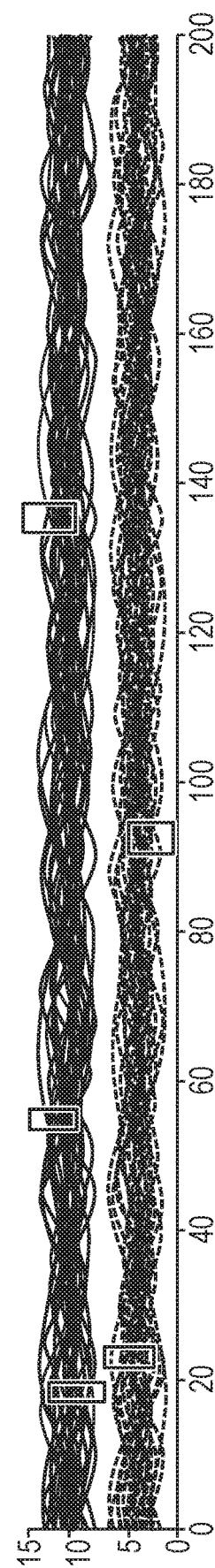
FIG. 6 is a graph illustrating results for simulation of 100 vehicles with five hazards (potential transportation threats).

The program code was augmented to simulate multiple vehicles traveling down the road, and the software tallied, for each vehicle, which hazards it hit or missed. FIGS. 4-6 depict the result for varying numbers of simulated vehicles and varying numbers of hazards generated. Vehicles travel from left to right; thus, the dark blue lines represent the left set of wheels, and the light blue lines represent the right set of wheels. The red boxes show the random hazards placed throughout the road.

Characterizing Each Hazard Type and Simulating a Pothole:

A next addition to the program implements a threat function for each of the five hazards being considered: pothole, bump, debris, ice, and water. Each threat function is a first order update equation that depends on the value from the previous time that the hazard at a specific location was last passed as well as weighted input characteristics for each type of hazard. For the ith time that a hazard is encountered, the threat update equation has the form:

$$ICE(i)=a0ICE(i-1)+a1C1+ \ldots +aN\,CN$$

where $C_1$ to $C_n$, are different characteristics (such as low temperature, accelerometer spike, wheel slip, etc.) and a0 to aN are weighted values of each characteristic and the previous threat value of ice being present ICE(i−1). In this example, the coefficients are defined such that a0+a1+ . . . +aN=1 and the values of Ci do not exceed a value of 1. Thus, the limit of ICE(i) over time can never exceed 1. Each different hazard type can have its own unique threat function that follows the same structure as above. Comparing the calculated POTHOLE(i), BUMP(i), DEBRIS(i), ICE(i), and WATER(i) values can allow a hazard at a specific location to be characterized as one of the five types considered. Since the threat functions are first order update equations, the characterization of each hazard increases in confidence as the number of times a hazard is impacted increases. The outcome is that one threat function rises in value above all others, while the other four functions vary around lower values.

Parameters that affect each of the five hazard types can be determined. These parameters can include: temperature, wheel slip, wheel lock-up, the gas pedal being applied, ABS activation, a spike in z-acceleration, a lateral swerve, the current location being on a bridge, precipitation in the forecast, hydroplaning, and the windshield wipers being active.

The pothole threat function can take into account: a negative spike in vertical accelerometer data, hard braking, and a lateral swerve attempting to avoid the hazard especially at good visibility, for example.

The bump threat function can take into account: a positive spike in vertical accelerometer data, hard braking, and a lateral swerve attempting to avoid the hazard with higher weight at good visibility, for example.

The debris threat function can take into account: a positive but noisy spike in vertical accelerometer data, hard braking, and multiple lateral swerve attempts to avoid the hazard at visibility, for example.

The ice threat function can take into account: temperatures just above freezing or lower, wheel slip while accelerating, wheels locking up while breaking, ABS activation, being on a bridge, precipitation in the forecast, and abrupt peaks in x-direction acceleration if the vehicle slides, for example.

The water threat function can take into account: temperatures above freezing, wheel slip while accelerating, wheels locking up while breaking, ABS activation, precipitation in the forecast, hydroplaning detected, windshield wipers active, and braking prior to encountering the hazard as a preventative measure, for example. To distinguish between ice and water, temperature can be a significant factor. Also, ice is expected to result in more extreme and faster wheel slip and lock up.

Simulating a Pothole:

The first hazard type implemented was a pothole, and the first step was to detect a pothole potential transportation threat. Along with a previous pothole threat function value, the characteristics that would feed into the pothole threat function can be a negative z-acceleration spike, preemptive braking, and a preventative, lateral swerve. Once these characteristics are determined, a program can simulate these characteristics for a vehicle that hits a pothole. The pothole threat function used in the example simulation is as follow:

$$POTHOLE(i)=0.3*POTHOLE(i-1)+0.5*NegZaccelSpike+0.1*Brake+0.1*leftRightSwerve$$

Figure 7:
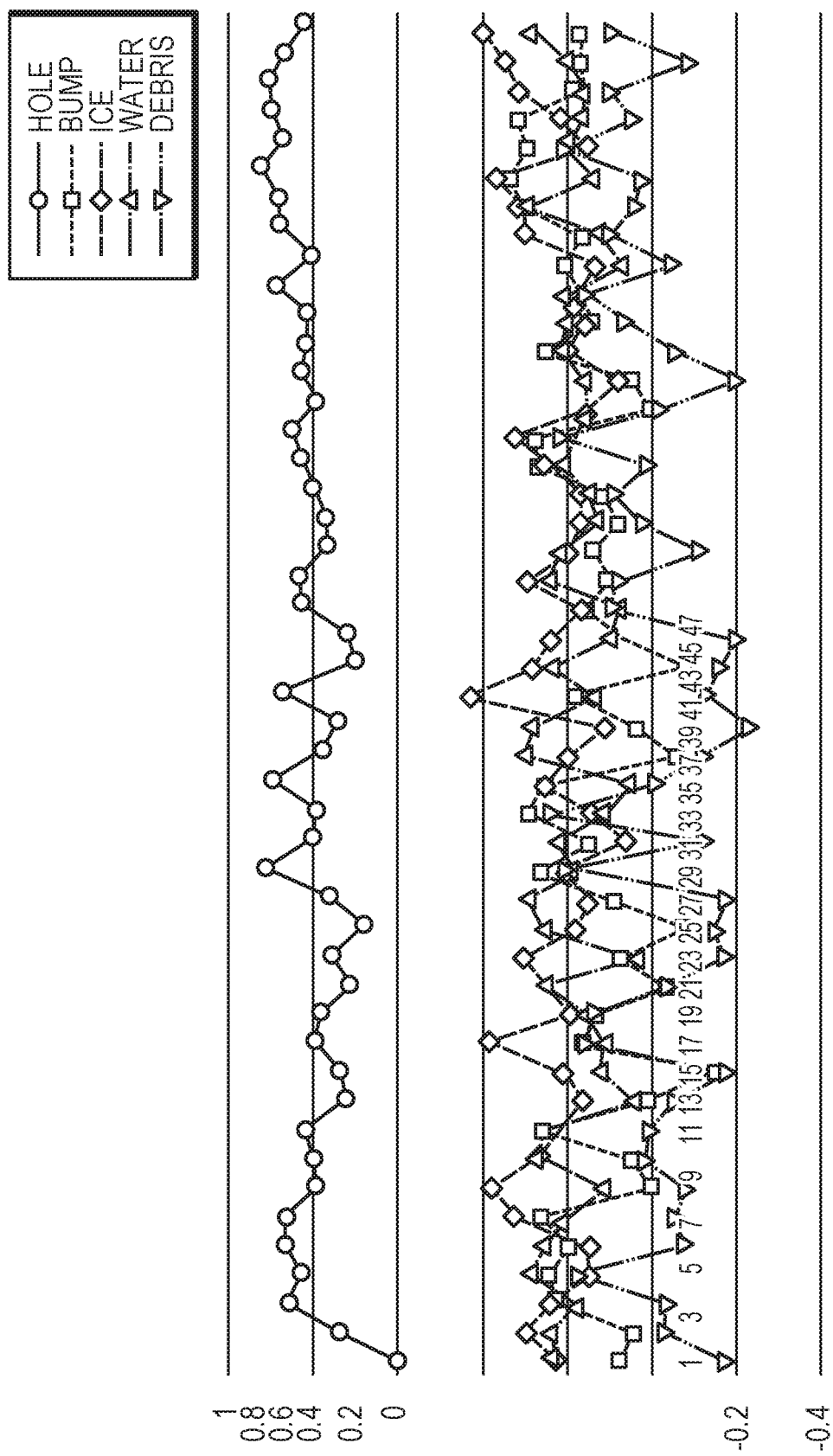
FIG. 7 is a graph illustrating threat values calculated for each hazard type each time a vehicle impacts a pothole in a simulation, with only pothole values being defined.

This threat update equation shows that vertical acceleration spikes, braking and lateral accelerations are all driving the input to the update equation, with the vertical acceleration spike having the highest weight. Threat values for each hazard type can be calculated every time a vehicle impacts the pothole, as illustrated in FIG. 7. The above values are not necessarily optimized and are used for illustration and simulation purposes.

FIG. 7. is a graph showing threat functions calculated for a pothole. The x-axis increments each time a vehicle hits the pothole, and the y-axis shows the values of the threat functions. The simulation shows the pothole threat function fluctuate near 1 and the four other threat functions fluctuate around 0, i.e. correct detection occurs.

Next, the generation of parameters that influence the four other threat functions can be changed from a random process to a process that outputs values that simulate the real world. Determining how to generate each of these parameters can follow the same process used for the parameters that go into the pothole threat function that is described above. The update equation coefficients for the pothole threat function can be modified to weight more heavily the previous threat value, and the coefficients for the four other hazards can be assigned as well. With logical values now feeding into all five threat functions, the above simulation can be repeated for a single pothole hazard on the road with the results shown in FIG. 8.

Figure 8:
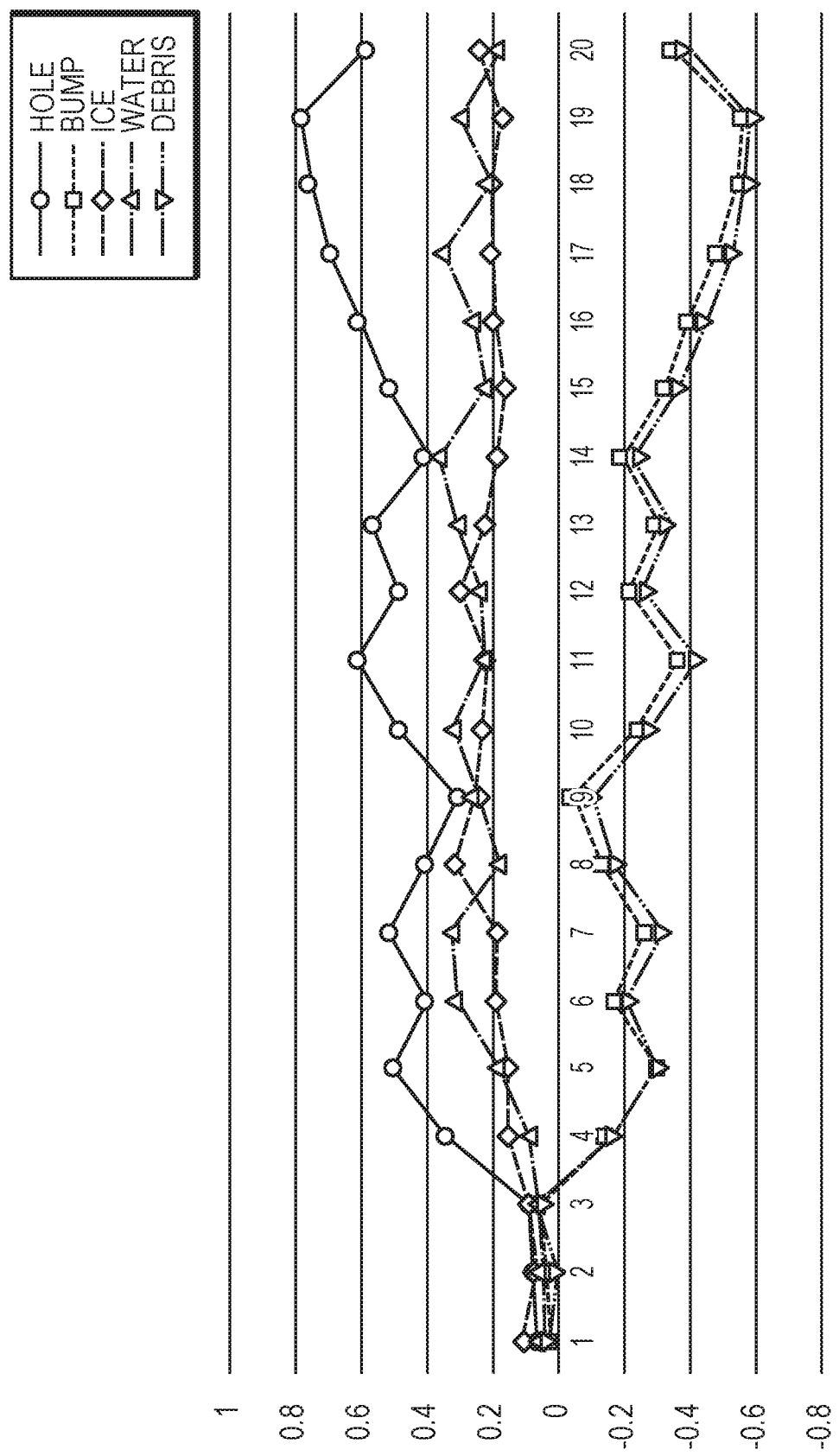
FIG. 8 is a graph illustrating calculated threat function values for a pothole a single pothole hazard on a road, with parameters being defined for hazards including a pothole, a bump, ice, water, and debris.

FIG. 8 shows threat function values calculated for a pothole, with all parameters being defined. Again, the simulation result shows the pothole function rising above the other four functions. However, in this case, the difference is less distinct due to the increased weight on the previous threat values. This causes the pothole function to take more time in order to be clearly larger than the rest. Later threat function values that are calculated and illustrated in FIG. 8 show simulated impact of participation rate, where the total number of vehicles equipped to send an inertial event report after passing a given geographic location is greater than 1 in the simulation, such that this total number can be compared with the number of equipped vehicles that have actually passed the location and which actually report an inertial event that is associated with the potential threat.

Determining when a Hazard is not Hit:

One issue can arise if the threat functions only update each time a hazard is impacted. In this scenario, if a vehicle avoids hitting the hazard, the threat values may not recalculate. It is helpful, therefore, to generate threat values when a vehicle passes over a location with a known threat, without hitting it, to determine when the hazard is no longer present. Over time, the hazard should disappear, whether that means that ice melted or a pothole was filled. Thus, the threat functions can be made to represent that.

Figure 9:
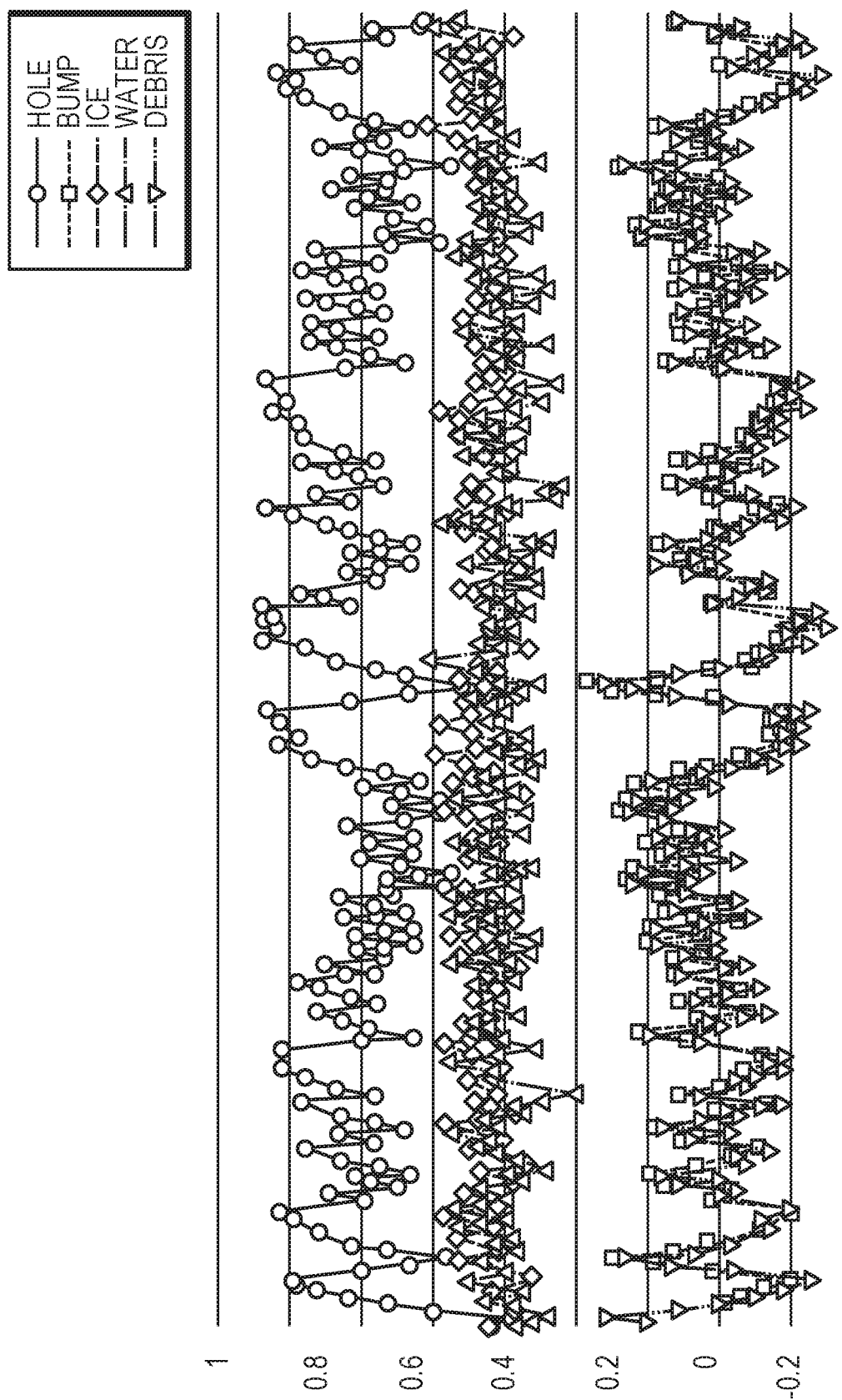
FIG. 9 is a graph illustrating threat function calculations for a pothole, including values being calculated and updated when the hazard is not hit by vehicle, but the vehicle instead passes over.

FIG. 9 shows the output of a modified program that recalculates threat function values for a pothole, with the values updated every time a vehicle passes a hazard, regardless of whether it is impacted. The results of FIG. 9 are clearly different from those of the previous two figures. The pothole threat function values shown in FIG. 9 distinctly decrease each time the simulated pothole is passed by a simulated vehicle without being hit. In FIG. 9, as in FIG. 8, the simulation results demonstrate the impact of participation rate in generating continuing measures of support for the various transportation threats potentially existing at the given geographic location assumed in the simulation.

Simulating all Five Hazard Types:

A further feature of the program is that it may simulate all five types of hazards, instead of simulating only a pothole, as in the simulations described hereinabove. The program may be reverted back to the point at which it can characterize a hazard as any of the five types of hazards of the set of hazards described above, every single hazard no longer being a pothole. All of the parameters taken into account may be generated differently for each hazard, depending on the type of hazard that it is defined to be. For example, in the simulation, an ice hazard can be generated by a temperature value below 32° F., and a bump in the road can generate a positive z-acceleration spike.

The program can also be modified to graph the calculated threat values automatically for every hazard, alongside a graph of whether each vehicle hit or missed the hazard. The graphical output can also list the hazard number, which is useful in the code for accessing the data calculated, as well as the type of hazard that the given graph is defined to depict.

FIGS. 10A-10B show example threat function output for a hazard defined to be a bump in the road. Comparing FIG. 10A with the FIG. 10B, it is clear how the bump threat function steadily increases over a span of time when it is consistently impacted. It is also clear that the function decreases when the hazard is missed.

Conclusions from Software Simulations

A version of the MATLAB® program described above outputs a clear depiction of how threat functions vary over time for various hazard types. The addition of calculating threat values when the hazard is both hit and missed effectively allows the function to either increase or decrease over time. Nonetheless, the obtained results can be made more ideal by various adjustments and additions to increase the accuracy of the simulation and threat functions further.

Further Threat Function Improvements:

The threat functions can be made to distinguish a bump from debris.

FIGS. 11A-11B show the results obtained from a simulation in which a hazard is defined to be debris. In this case, the unimproved threat functions may tend to characterize the hazard as a bump. Theoretically comparing the result of a bump to a result from debris, the bump may be expected to cause a stronger, singular impulse in the suspension, while debris would likely cause a more noisy and extended suspension response. Also, the debris will likely change each time it is impacted, while a bump would likely remain about the same, regardless of the number of impacts. Thus, the threat values for a bump may remain relatively constant, while the values for debris may be expected to have more variation, with a larger area of the road affected by the debris. Further, debris may be expected to be more visible than a bump or hole in the asphalt. Thus, depending on visibility conditions, if a driver preventatively brakes or swerves to avoid the hazard, the debris function may weight this action more heavily than the pothole or bump functions.

Even beyond these improvements, the program may still be further enhanced to distinguish between a bump and debris. The program may be modified such that the bump and debris threat functions are combined. In this case, only four different hazards are considered. A significant bump in the road is not a frequent occurrence. Usually, z-acceleration spikes can be caused by potholes or debris. True bumps, like speedbumps in residential areas and parking lots, may be easily identified, and these locations may or may not be considered as hazards.

The program may also be improved to distinguish between ice and water hazards. To improve the overall accuracy of the simulation, the generation of parameters can be refined further so as to represent the real world more precisely. For example, when parameters are simulated for an ice hazard, each time it is passed, the program may generate a random temperature between 0° and 32° F. A better representation of reality may generate a single temperature in this range for the hazard and allow it to only vary plus or minus a few degrees each time it is passed by a vehicle.

Simulation Considerations:

Another improvement that can be made is to utilize real accelerometer data, determine if there is a presence of a spike in any direction, and then map the value of that spike to the range of 0 to 1. A software simulation may limit itself to creating a dummy value within that range, simply generating a large value if a pothole, bump, or debris is hit or a small value if one of those hazards is not hit.

A time scale may also be implemented. A software simulation may limit itself to simulating each vehicle driving down the road, one after the other, all with equal time between each other. In other simulations, however, the software may simulate increases and decreases in traffic, as well as the effect of traffic signals controlling the flow of vehicles.

Other Considerations:

Implementing a time scale can lead to another very intriguing consideration related to V2V communication. If this method is successfully implemented and a hazard is successfully detected, then all the upcoming vehicles can know about the hazard and avoid hitting it. This can result in the threat functions for that hazard decreasing as every single vehicle passes by without impact. Hazards can be determined to no longer be present. A simulation program can allow vehicles to pass over a location of a previously known hazard in order to see whether the hazard is truly gone. One of the preferable ways to deal with this oscillatory effect, i.e. instabilities in the reported threat levels due to feedback, is to use input scaling by a function of vehicle speed, preferably the square of the speed. This essentially eliminates the nonlinear dependence of accelerations on speed in the feedback loop.

Further, a low-pass filter may be applied to the threat functions. As seen in the figures described herein, the threat functions can be quite volatile. This volatility can be mitigated with further refinement of parameter generation, and further optimizing (recursive) coefficients can also stabilize the threat functions. However, a low-pass filter can still provide additional smoothing of the threat functions that can increase confidence in the method.

Appendix A: Examples of Coefficient Values

A1. FIG. 7
$a_{pothole0}$=0.3; previous value
$a_{pothole1}$=0.5; negative z accel spike
$a_{pothole2}$=0.1; brake
$a_{pothole3}$=0.1; lateral swerve
$a_{bump0}$=0.25; previous value
$a_{bump1}$=0.25; positive z accel spike
$a_{bump2}$=0.25; hard brake
$a_{bump3}$=0.25; lateral swerve
$a_{debris0}$=0.25; previous value
$a_{debris1}$=0.25; positive z accel spike
$a_{debris2}$=0.25; hard brake
$a_{debris3}$=0.25; lateral swerve
$a_{ice0}$=0.125; previous value
$a_{ice1}$=0.125; temperature
$a_{ice2}$=0.125; wheel slip+gas
$a_{ice3}$=0.125; wheel lockup+brake
$a_{ice4}$=0.125; ABS
$a_{ice5}$=0.125; bridge location
$a_{ice6}$=0.125; precipitation
$a_{ice7}$=0.125; lateral swerve awater0=0.125; previous value
awater1=0.125; temperature
awater2=0.125; wheel slip+gas
awater3=0.125; wheel lockup+brake
awater4=0.125; ABS
awater5=0.125; precipitation
awater6=0.125; hydroplaning
awater7=0.125; wipers active
    A2. FIG. 8
apothole0=0.7; previous value
apothole1=0.25; negative z accel spike
apothole2=0.025; brake
apothole3=0.025; lateral swerve
abump0=0.7; previous value
abump1=0.25; positive z accel spike
abump2=0.025; hard brake
abump3=0.025; lateral swerve
adebris0=0.7; previous value
adebris1=0.25; positive z accel spike
adebris2=0.025; hard brake
adebris3=0.025; lateral swerve
aice0=0.5; previous value
aice1=0.1; temperature
aice2=0.1; wheel slip+gas
aice3=0.1; wheel lockup+brake
aice4=0.025; ABS
aice5=0.025; bridge location
aice6=0.05; precipitation
aice7=0.1; lateral swerve
awater0=0.5; previous value
awater1=0.1; temperature
awater2=0.1; wheel slip+gas
awater3=0.1; wheel lockup+brake
awater4=0.025; ABS
awater5=0.05; precipitation
awater6=0.025; hydroplaning
awater7=0.1; wipers active
    A3. FIG. 9
apothole0=0.7; previous value
apothole1=0.25; negative z accel spike
apothole2=0.025; brake
apothole3=0.025; lateral swerve
abump0=0.7; previous value
abump1=0.25; positive z accel spike
abump2=0.025; hard brake
abump3=0.025; lateral swerve
adebris0=0.7; previous value
adebris1=0.25; positive z accel spike
adebris2=0.025; hard brake
adebris3=0.025; lateral swerve
aice0=0.5; previous value
aice1=0.1; temperature
aice2=0.1; wheel slip+gas
aice3=0.1; wheel lockup+brake
aice4=0.025; ABS
aice5=0.025; bridge location
aice6=0.05; precipitation
aice7=0.1; lateral swerve
awater0=0.5; previous value
awater1=0.1; temperature
awater2=0.1; wheel slip+gas
awater3=0.1; wheel lockup+brake
awater4=0.025; ABS
awater5=0.05; precipitation
awater6=0.025; hydroplaning
awater7=0.1; wipers active
    A4. FIG. 10 apothole0=0.7; previous value
apothole1=0.25; negative z accel spike
apothole2=0.025; brake
apothole3=0.025; lateral swerve
abump0=0.7; previous value
abump1=0.25; positive z accel spike
abump2=0.025; hard brake
abump3=0.025; lateral swerve
adebris0=0.6; previous value
adebris1=0.15; positive z accel spike
adebris2=0.1; hard brake
adebris3=0.1; lateral swerve
aice0=0.5; previous value
aice1=0.1; temperature
aice2=0.1; wheel slip+gas
aice3=0.1; wheel lockup+brake
aice4=0.025; ABS
aice5=0.025; bridge location
aice6=0.05; precipitation
aice7=0.1; lateral swerve
water0=0.5; previous value
awater1=0.2; temperature
awater2=0.025; wheel slip+gas
awater3=0.025; wheel lockup+brake
awater4=0.025; ABS
awater5=0.1; precipitation
awater6=0.025; hydroplaning
awater7=0.1; wipers active
    A5. FIG. 11
apothole0=0.7; previous value
apothole1=0.25; negative z accel spike
apothole2=0.025; brake
apothole3=0.025; lateral swerve
abump0=0.7; previous value
abump1=0.25; positive z accel spike
abump2=0.025; hard brake
abump3=0.025; lateral swerve
adebris0=0.6; previous value
adebris1=0.15; positive z accel spike
adebris2=0.1; hard brake
adebris3=0.1; lateral swerve
aice0=0.5; previous value
aice1=0.1; temperature
aice2=0.1; wheel slip+gas
aice3=0.1; wheel lockup+brake
aice4=0.025; ABS
aice5=0.025; bridge location
aice6=0.05; precipitation
aice7=0.1; lateral swerve
awater0=0.5; previous value
awater1=0.2; temperature
awater2=0.025; wheel slip+gas
awater3=0.025; wheel lockup+brake
awater4=0.025; ABS
awater5=0.1; precipitation
awater6=0.025; hydroplaning
awater7=0.1; wipers active While example embodiments have been particularly shown and described, it will be understood by those skilled in the art that various changes in form and details may be made therein without departing from the scope of the embodiments encompassed by the appended claims.

What is claimed is:

1. A transportation threat detection system comprising:
a communication module configured to receive an inertial event report from a reporting vehicle, the inertial event report including (i) an indication of an inertial event from an inertial sensor at the reporting vehicle, and (ii) an indication of a geographic location associated with the inertial event;

a fusion processor configured to associate the inertial event report with a potential transportation threat, consistent with the inertial event report and at the geographic location, the fusion processor further configured to generate a measure of support for the transportation threat potentially existing at the geographic location based on a participation rate generated using any additional inertial event reports received from respective additional reporting vehicles; and a reporting interface configured to render output indicative of the potential transportation threat, the reporting interface rendering said output as a function of the generated measure of support, wherein the fusion processor is configured via speed dependent input scaling to distinguish between an inertial event caused only by the potential transportation threat and an inertial event caused by the potential transportation threat and a reaction, to the rendered output, of a receiving vehicle that receives the rendered output.

2. The system of claim 1, wherein the measure of support is a probability, plausibility, belief or some other quantification of the threat, i.e. a measure of the threat level.

3. The system of claim 1, wherein the communication module, fusion processor, and reporting interface form part of a transportation threat management system server.

4. The system of claim 1, wherein the fusion processor is further configured to generate respective measures of support for a plurality of distinct potential transportation threats potentially existing at the geographic location.

5. The system of claim 1, wherein the measure of support is an initial measure of support, and wherein the fusion processor is further configured to generate an updated measure of support for the transportation threat potentially continuing to exist at the geographic location, the updated measure of support being generated as a function of both the initial measure of support and an additional inertial event report received subsequent to generation of the initial measure of support.

6. The system of claim 1, wherein the potential transportation threat is a hazard resulting from ice, water, oil, or debris on a road; or wherein the potential transportation threat is an animal or human on or near the road, or wherein the potential transportation threat is an oncoming traffic danger, an erratic driver, or another moving threat.

7. The system of claim 1, wherein the potential transportation threat is a pothole, a dangerous intersection, a vehicular accident, or an unidentified potential threat.

8. The system of claim 1, wherein the potential transportation threat is a limited visibility, a storm, wind, a tornado, a lightning strike, or another weather-based event.

9. The system of claim 1, wherein the communication module is further configured to receive the rendered output indicative of the potential transportation threat and to communicate said rendered output to the receiving vehicle, and wherein the receiving vehicle is autonomous, semi-autonomous, or operated by a driver.

10. The system of claim 1, wherein the communication module is further configured to receive the rendered output indicative of the potential transportation threat and to communicate said rendered output to a navigation system of the receiving vehicle, a mobile computing device, a mobile telephone, or other mobile communication device.

11. The system of claim 1, wherein the rendered output indicative of the potential transportation threat forms part of a local threat map indicating one or more threats in a current or future environment of the receiving vehicle that receives the rendered output, or wherein the rendered output forms part of a global threat map indicating one or more threats in a geographic region that is larger than the current or future environment of the receiving vehicle.

12. The system of claim 1, wherein the communication module is further configured to receive the rendered output indicative of the potential transportation threat and to communicate the rendered output to a governmental, commercial, or news facility.

13. The system of claim 1, wherein the inertial sensor is in a mobile computing device at the reporting vehicle.

14. The system of claim 1, wherein the inertial sensor is an on-board vehicle sensor at the reporting vehicle.

15. The system of claim 1, wherein the geographic location is provided via a GPS receiver of a mobile computing device or on-board navigation system at the reporting vehicle.

16. The system of claim 1, wherein the communication module is further configured to receive the inertial event report from the reporting vehicle via an application running on a mobile computing device at the reporting vehicle.

17. The system of claim 1, wherein the processor is further configured to query, automatically, through the communication module, vehicles approaching the geographic location associated with the inertial event to obtain the additional inertial event reports to determine the participation rate.

18. The system of claim 1, wherein the fusion processor is further configured to generate the measure of support using a time-variant, nonlinear threat update equation.

19. The system of claim 1, wherein the fusion processor is further configured to generate the measure of support for the transportation threat potentially existing at the geographic location based further on information from a lidar sensor, an ultrasonic sensor, an infrared sensor such as an infrared thermometer, a camera, or a stereo camera device attached to or forming part of a mobile communication device or the reporting vehicle.

20. The system of claim 1, wherein the measure of support is a normalized threat level.

21. The system of claim 1, wherein the speed dependent input scaling is scaling of an acceleration sensor signal at the reporting vehicle.

22. The system of claim 21, wherein the speed dependent input scaling is quadratic scaling with speed.

23. A transportation threat detection system comprising:

a communication module configured to receive one or more inertial event reports from one or more respective reporting vehicles, the one or more inertial event reports based on speed dependent input scaling of accelerometer signals;

a fusion processor configured to associate the one or more inertial event reports with a potential transportation threat, the fusion processor further configured to generate a measure of support for the transportation threat; and a reporting interface configured to render output indicative of the potential transportation threat, the reporting interface rendering said output as a function of the generated measure of support.

* * * * *